United States Patent
Yamagishi et al.

(10) Patent No.: US 9,451,298 B2
(45) Date of Patent: Sep. 20, 2016

(54) TRANSMISSION DEVICE, TRANSMISSION METHOD, AND NETWORK APPARATUS

(71) Applicants: Yasuaki Yamagishi, Kanagawa (JP); Ikuo Tsukagoshi, Tokyo (JP)

(72) Inventors: Yasuaki Yamagishi, Kanagawa (JP); Ikuo Tsukagoshi, Tokyo (JP)

(73) Assignee: Sony Corporation (JP)

( * ) Notice: Subject to any disclaimer, the term of this patent is extended or adjusted under 35 U.S.C. 154(b) by 84 days.

(21) Appl. No.: 14/239,914

(22) PCT Filed: Jun. 21, 2013

(86) PCT No.: PCT/JP2013/067148
§ 371 (c)(1),
(2) Date: Feb. 20, 2014

(87) PCT Pub. No.: WO2014/007083
PCT Pub. Date: Jan. 9, 2014

(65) Prior Publication Data
US 2014/0189772 A1    Jul. 3, 2014

(30) Foreign Application Priority Data
Jul. 2, 2012    (JP) .................... 2012-148609

(51) Int. Cl.
*H04N 21/235* (2011.01)
*H04N 21/218* (2011.01)
(Continued)

(52) U.S. Cl.
CPC ...... *H04N 21/2353* (2013.01); *H04L 65/4084* (2013.01); *H04L 65/4092* (2013.01); *H04L 65/80* (2013.01); *H04L 67/2852* (2013.01); *H04N 21/20* (2013.01); *H04N 21/21* (2013.01); *H04N 21/218* (2013.01); *H04N 21/2183* (2013.01); *H04N 21/21805* (2013.01); *H04N 21/21815* (2013.01); *H04N 21/2225* (2013.01); *H04N 21/23106* (2013.01); *H04N 21/26258* (2013.01); *H04N 21/47202* (2013.01); *H04N 21/81* (2013.01); *H04N 21/816* (2013.01); *H04N 21/8146* (2013.01); *H04N 21/8456* (2013.01)

(58) Field of Classification Search
None
See application file for complete search history.

(56) References Cited

U.S. PATENT DOCUMENTS

| 6,757,305 B1 | 6/2004 | Soepenberg et al. |
| 2003/0018607 A1* | 1/2003 | Lennon et al. ................... 707/1 |

(Continued)

FOREIGN PATENT DOCUMENTS

| JP | 11-149405 | 6/1999 |
| JP | 2002-518894 A | 6/2002 |

(Continued)

OTHER PUBLICATIONS

Extended European Search Report for EP Application No. 13812646.1, dated Nov. 26, 2015.

(Continued)

*Primary Examiner* — Justin Shepard
(74) *Attorney, Agent, or Firm* — Lerner, David, Littenberg, Krumholz & Mentlik, LLP

(57) ABSTRACT

To increase the efficiency of a cache and delivery resource control of video data streams in a network.
A meta file including information used by a client terminal to acquire a predetermined number of video data streams of given content deliverable by a delivery server via a network is generated. When a transmission request is received from a client terminal, the meta file is transmitted to the client terminal via the network. The meta file includes an index regarding a cache of each of the video data streams.

9 Claims, 23 Drawing Sheets

(51) Int. Cl.
*H04N 21/81* (2011.01)
*H04N 21/2183* (2011.01)
*H04N 21/20* (2011.01)
*H04N 21/21* (2011.01)
*H04N 21/2225* (2011.01)
*H04N 21/231* (2011.01)
*H04N 21/262* (2011.01)
*H04N 21/472* (2011.01)
*H04N 21/845* (2011.01)
*H04L 29/06* (2006.01)
*H04L 29/08* (2006.01)

(56) References Cited

U.S. PATENT DOCUMENTS

| | | |
|---|---|---|
| 2003/0204602 A1 | 10/2003 | Hudson et al. |
| 2004/0033101 A1 | 2/2004 | Fernschild et al. |
| 2008/0229371 A1* | 9/2008 | Mick et al. ............... 725/87 |
| 2010/0034519 A1* | 2/2010 | Kato ................. H04N 5/85 386/248 |
| 2012/0124179 A1 | 5/2012 | Cappio et al. |
| 2012/0259994 A1* | 10/2012 | Gillies et al. ............ 709/231 |
| 2012/0331513 A1 | 12/2012 | Yamagishi et al. |

FOREIGN PATENT DOCUMENTS

| | | |
|---|---|---|
| JP | 2011-193058 A | 9/2011 |
| WO | 2010-131638 A1 | 11/2010 |

OTHER PUBLICATIONS

Blefari Melassi, Nicola et al. "DASH and MMT as seen from an ICN viewpoint," Coding of Moving Pictures and Audio (2012) ISO/IECJTC1/SC29/WG11 M23843 San Jose, CA.

Pyle, Harry, "DASH: Multiple SegmentInfoDefault Elements," Coding of Moving Pictures and Audio ISO/IECJTC1/SC29/WG11 MPEG2011 (2011) Torino, Italy.

3rd Generation Partnership Project 3GPP A Global Initiative 3GPP TR 26.938 vo.2.0 (2012).

* cited by examiner

RELATIONSHIP AMONG Period, Representation, and Segment

FIG. 10

DEFINITION OF DescriptorType ELEMENT

| ELEMENT | MANDATORY/OPTIONAL | REMARKS |
|---|---|---|
| DescriptorType (ELEMENT) | | DESCRIPTOR TYPE |
| @schemeIdUri (PROPERTY) | MANDATORY | URN OR URL SPECIFYING DICTIONARY SCHEMA (NAME SPACE) |
| @value (PROPERTY) | OPTIONAL | VALUE DEFINED IN DICTIONARY SCHEMA SPECIFIED BY SchemeIdUri ABOVE |

("@" INDICATES PROPERTY)

FIG. 11

DEFINITION OF ViewPoint ELEMENT

| ELEMENT | MANDATORY/OPTIONAL | REMARKS |
|---|---|---|
| ViewPoint (ELEMENT) | | VIEWPOINT TYPE |
| @schemeIdUri (PROPERTY) | MANDATORY | URN OR URL SPECIFYING DICTIONARY SCHEMA (NAME SPACE) THAT DEFINES VIEWPOINT |
| @value (PROPERTY) | OPTIONAL | VALUE DEFINED IN DICTIONARY SCHEMA SPECIFIED BY SchemeIdUri ABOVE |

("@" INDICATES PROPERTY)

FIG. 12

DEFINITION OF VIEWPOINT DICTIONARY

| ENTRIES IN DICTIONARY | URN |
|---|---|
| RIGHTMOST | urn:aaaa:dash:vp:stereo-right |
| LEFTMOST | urn:aaaa:dash:vp:stereo-left |
| MIDDLE | urn:aaaa:dash:vp:center |
| RIGHT MIDDLE (MIDDLE BETWEEN MIDDLE AND RIGHTMOST) | urn:aaaa:dash:vp:stereo-right-center |
| LEFT MIDDLE (MIDDLE BETWEEN MIDDLE AND LEFTMOST) | urn:aaaa:dash:vp:stereo-left-center |

FIG. 14

DEFINITION OF CacheParameter ELEMENT

| ELEMENT | MANDATORY/OPTIONAL | REMARKS |
|---|---|---|
| ViewPoint (ELEMENT) | | CACHE PARAMETER TYPE |
| @schemeIdUri (PROPERTY) | MANDATORY | URN OR URL SPECIFYING DICTIONARY SCHEMA (NAME SPACE) THAT DEFINES CACHE PARAMETER |
| @value (PROPERTY) | OPTIONAL | VALUE DEFINED IN DICTIONARY SCHEMA SPECIFIED BY SchemeIdUri ABOVE |

("@" INDICATES PROPERTY)

FIG. 15

DEFINITION OF CACHE PARAMETER DICTIONARY

| ENTRIES IN DICTIONARY | URN |
|---|---|
| high | urn:aaaa:dash:cp:high |
| middle | urn:aaaa:dash:cp:middle |
| low | urn:aaaa:dash:cp:low |

FIG. 17

DEFINITION OF CACHE PARAMETER DICTIONARY (ADDITION)

| ENTRIES IN DICTIONARY | URN |
|---|---|
| long | urn:aaaa:dash:cp:long |
| short | urn:aaaa:dash:cp:short |

FIG. 19

| CACHE CONTROL POLICY | | EXPIRY TIME | | |
|---|---|---|---|---|
| | | Long | Short | NOT SPECIFIED (N/A) |
| PRIORITY | High | url LIST (INCLUDING REGULAR EXPRESSION OF url) | url LIST (INCLUDING REGULAR EXPRESSION OF url) | url LIST (INCLUDING REGULAR EXPRESSION OF url) |
| | Middle | url LIST (INCLUDING REGULAR EXPRESSION OF url) | url LIST (INCLUDING REGULAR EXPRESSION OF url) | url LIST (INCLUDING REGULAR EXPRESSION OF url) |
| | Low | url LIST (INCLUDING REGULAR EXPRESSION OF url) | url LIST (INCLUDING REGULAR EXPRESSION OF url) | url LIST (INCLUDING REGULAR EXPRESSION OF url) |
| | NOT SPECIFIED (N/A) | url LIST (INCLUDING REGULAR EXPRESSION OF url) | url LIST (INCLUDING REGULAR EXPRESSION OF url) | |

FIG. 20

| CACHE CONTROL POLICY | | EXPIRY TIME | | |
|---|---|---|---|---|
| | | Long | N/A | Short |
| PRIORITY | High | url11, url12, url13, url14, url15, url16, url17, url18, url51, url52, url53, url54, url55, url56, url57, url58 | | |
| | Middle | | url31, url32, url33, url34, url35, url36, url37, url38 | |
| | Low | | | url21, url22, url23, url24, url25, url26, url27, url28, url41, url42, url43, url44, url45, url46, url47, url48 |
| | N/A | | | |

TRANSMISSION DEVICE, TRANSMISSION METHOD, AND NETWORK APPARATUS

The present application is a national phase entry under 35 U.S.C. §371 of International Application No. PCT/JP2013/067148 filed Jun. 21, 2013, published on Jan. 9, 2014 as WO 2014/007083 A1, which claims priority from Japanese Patent Application No. JP 2012-148609 filed in the Japanese Patent Office on Jul. 2, 2012

TECHNICAL FIELD

The present invention relates to a transmission device, a transmission method, and a network apparatus and, in particular, to a transmission device or the like in which a delivery server transmits a meta file having information regarding a predetermined number of video data streams of given content deliverable via a network to a client terminal via the network.

BACKGROUND ART

IPTV (Internet Protocol Television) delivery systems that use a network, such as the Internet, have been proposed (refer to, for example, PTL 1). In recent years, standardization of Internet streaming, such as IPTV (Internet Protocol Television), has been conducted. For example, standardization of VoD (Video on Demand) streaming using HTTP (Hypertext Transfer Protocol) streaming and a technique applied to live streaming has been accomplished.

In particular, DASH (Dynamic Adaptive Streaming over HTTP) standardized by ISO/IEC/MPEG has attracted attention. In DASH, a client terminal acquires streaming data on the basis of a meta file called MPD (Media Presentation Description) and the address (url) of chunked media data written in the meta file and, subsequently, reproduces the streaming data. In such a case, an example of the media data is audio/video/subtitle data.

CITATION LIST

Patent Literature

PTL 1: Japanese Unexamined Patent Application Publication No. 2011-193058

SUMMARY OF INVENTION

Technical Problem

An object of the present technology is to improve the efficiency of cache and delivery resource management of video data streams in a network.

Solution to Problem

A concept of the present technology resides in a transmission device including a meta file generating unit configured to generate a meta file including information used by a client terminal to acquire a predetermined number of video data streams of given content deliverable by a delivery server via a network and a meta file transmitting unit configured to upon receiving a transmission request from the client terminal, transmitting the meta file to the client terminal via the network. The meta file generating unit sets, in the meta file, an index regarding a cache of each of the video data streams in the network.

In the present technology, the meta file generating unit generates the meta file. The meta file includes information used by a client terminal to acquire a predetermined number of video data streams of given content deliverable by a delivery server via a network. In addition, upon receiving a transmission request from the client terminal, the meta file transmitting unit transmits the meta file to the client terminal via the network.

The meta file generating unit sets, in the meta file, the index regarding a cache of each of the video data streams in the network. For example, the index may be the index of a cache priority of a corresponding video data stream in the network. Alternatively, the index may be the index of the cache expiry time of a corresponding video data stream in the network.

Note that according to the present technology, for example, the predetermined number of video data streams may be multi-view video data streams that constitute a three-dimensional image. In addition, the meta file generating unit may determine the index regarding a cache of each of the multi-view video data streams on the basis of viewpoint groups classified using estimated frequency of a request for delivery of each of the multi-view video data streams.

Furthermore, according to the present technology, for example, the predetermined number of video data streams may be MPEG-DASH based video data streams, the meta file may be an MPD file, and the network may be a CDN. Still furthermore, for example, the meta file generating unit may set, in the MPD file, the index regarding a cache of each of the video data streams in the network using a DescriptorType element.

As described above, according to the present technology, the index regarding the cache of a video data stream in the network is set in the meta file. Accordingly, in the network, cache and delivery resource management of each of the video data streams can be efficiently performed on the basis of the index regarding the cache.

Another concept of the present technology resides in a network apparatus including a plurality of cache servers and a predetermined number of cache management servers. Upon receives a meta file including information used by a client terminal to acquire a predetermined number of video data streams of given content deliverable by a delivery server via a network, the cache server transmits the meta file to the cache management server. The cache management server generates a cache control policy on the basis of an index regarding a cache of each of the video data streams in the network included in the meta file and distributes the cache control policy to each of the cache servers.

According to the present technology, the network apparatus includes a plurality of cache servers and a predetermined number of cache management servers. Upon receives a meta file including information used by a client terminal to acquire a predetermined number of video data streams of given content deliverable by a delivery server via a network, the cache server transmits the meta file to the cache management server.

The cache management server generates a cache control policy on the basis of an index regarding a cache of each of the video data streams in the network included in the meta file and distributes the cache control policy to each of the cache servers. The cache servers perform a caching process on the video streams on the basis of the cache control policy.

Note that according to the present technology, for example, the index regarding a cache may be an index of a cache priority and/or an index of a cache expiry time. In addition, according to the present technology, for example, the predetermined number of video data streams may be MPEG-DASH based video data streams, the meta file may be an MPD file, and the cache server may be a DASH cache server.

As described above, according to the present technology, a cache control policy is generated on the basis of the index regarding a cache set in the meta file and is distributed to each of the cache servers. Thereafter, the cache server can perform a caching process of each of the video streams on the basis of the cache control policy. Accordingly, cache and delivery resource management of each of the video data streams can be efficiently performed.

Advantageous Effects of Invention

According to the present technology, the efficiency in cache and delivery resource management of video data streams in a network can be improved.

BRIEF DESCRIPTION OF DRAWINGS

FIG. 10 illustrates the definition of the DescriptorType element.

FIG. 11 illustrates the definition of the ViewPoint element.

FIG. 12 illustrates an example of the definition of a dictionary schema (a name space) as "urn:aaaa:dash:vp".

FIG. 14 illustrates the definition of the CacheParameter element.

FIG. 15 illustrates an example of the definition of a cache parameter dictionary in which the dictionary schema (the name space) is "urn:aaaa:dash:cp".

FIG. 17 illustrates the cache parameter dictionary having an additionally set dictionary schema item indicating whether the retention period for the cache server in a CDN is long or short.

FIG. 19 illustrates a cache control policy that is generated on the basis of the index of a cache priority and the index of a cache expiry time and that includes lists each including a url regular expression and corresponding to one of the classes of the index of a cache priority and one of the classes of the index of a cache expiry time.

FIG. 20 illustrates an example of a cache control policy.

DESCRIPTION OF EMBODIMENTS

Embodiments of the invention are described below. Note that description is made in the following order:

1. Embodiments
2. Modifications

<1. Embodiments>
[Stream Delivery System]

Figure 1:
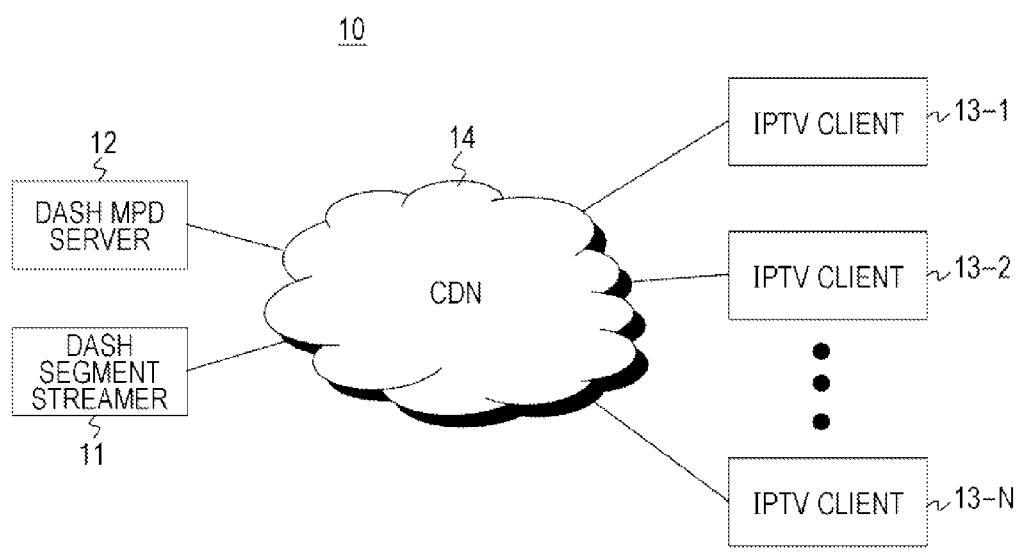
FIG. 1 is a block diagram of an example of the configuration of a stream delivery system according to an embodiment.

FIG. 1 illustrates an example of the configuration of a stream delivery system 10 according to an embodiment. The stream delivery system 10 is an MPEG-DASH based stream delivery system. The stream delivery system 10 has a configuration in which a DASH segment streamer 11 and a DASH MPD server 12 have N IPTV clients 13-1, 13-2, . . . , and 13-N connected thereto via a CDN (Content Delivery Network) 14.

The DASH segment streamer 11 generates a stream segment that complies with DASH (hereinafter referred to as a "DASH segment") on the basis of media data (e.g., video data, audio data, and subtitle data) of given content and transmits the segment in response to an HTTP request from an IPTV client. The DASH segment streamer 11 is configured as a Web server.

According to the present embodiment, the DASH segment streamer 11 generates the DASH segments of five video data streams based on video data obtained from, for example, the following five viewpoints: the leftmost, the left middle, the middle, the right middle, and the rightmost viewpoints. In addition, the DASH segment streamer 11 generates the DASH segments with a plurality of rates as the DASH segments of the video streams from the plurality of viewpoints. Note that the term "left middle viewpoint" refers to a viewpoint from the middle point between the leftmost viewpoint and the middle viewpoint. In addition, the term "right middle viewpoint" refers to a viewpoint from the middle point between the rightmost viewpoint and the middle viewpoint.

In addition, in response to a request for the segment of a given stream transmitted from the IPTV client 13 (13-1, 13-2, . . . , 13-N) via the CDN 14, the DASH segment streamer 11 transmits the segment of the stream to the requester (the IPTV client 13) via the CDN 14. In such a case, the IPTV client 13 refers to the rate value set in an MPD (Media Presentation Description) file. Thereafter, the IPTV client 13 selects one of the streams having a rate optimum for the condition of the network environment in which the client is located and sends the request.

Furthermore, the IPTV client 13 requests the segment of the video data stream observed from a viewpoint in accordance with the performance of the IPTV client 13. For example, when the IPTV client 13 has the lowest device grade and, thus, processes image data observed from only two viewpoints, that is, the leftmost viewpoint and rightmost viewpoint, the IPTV client 13 requests the segments of the video data streams observed from the two viewpoints. Still furthermore, if, for example, the IPTV client 13 has the medium device grade and, thus, processes image data observed from the middle viewpoint in addition to the leftmost and rightmost viewpoints, the IPTV client 13 requests the segments of the video data streams observed from the three viewpoints. Yet still furthermore, if, for example, the IPTV client 13 has the highest device grade and, thus, processes image data observed from the five viewpoints, that is, the left middle viewpoint (the viewpoint observed from the middle point between the leftmost viewpoint and the middle viewpoint) and the right middle viewpoint (the viewpoint observed from the middle point between the rightmost viewpoint and the middle viewpoint) in addition to the leftmost, rightmost, and middle viewpoints, the IPTV client 13 requests the segments of the video data streams observed from the five viewpoints.

The DASH MPD server 12 is a server that generates an MPD file used for acquiring a DASH segment generated by the DASH segment streamer 11. The DASH MPD server 12 generates the MPD file on the basis of content meta data received from a content management server (not illustrated in FIG. 1) and the address (url) of the segment generated by the DASH segment streamer 11.

In an MPD format, the property is set for each of the streams, such as the video streams and the audio streams, using an element called "Representation". For example, for each of the video data streams having different rates, the rate is set in the MPD file by changing the representation. The IPTV client 13 can refer to the rate value and select the optimum stream in accordance with the conditions of the network environment in which the IPTV client 13 is located, as described above.

Figure 2:
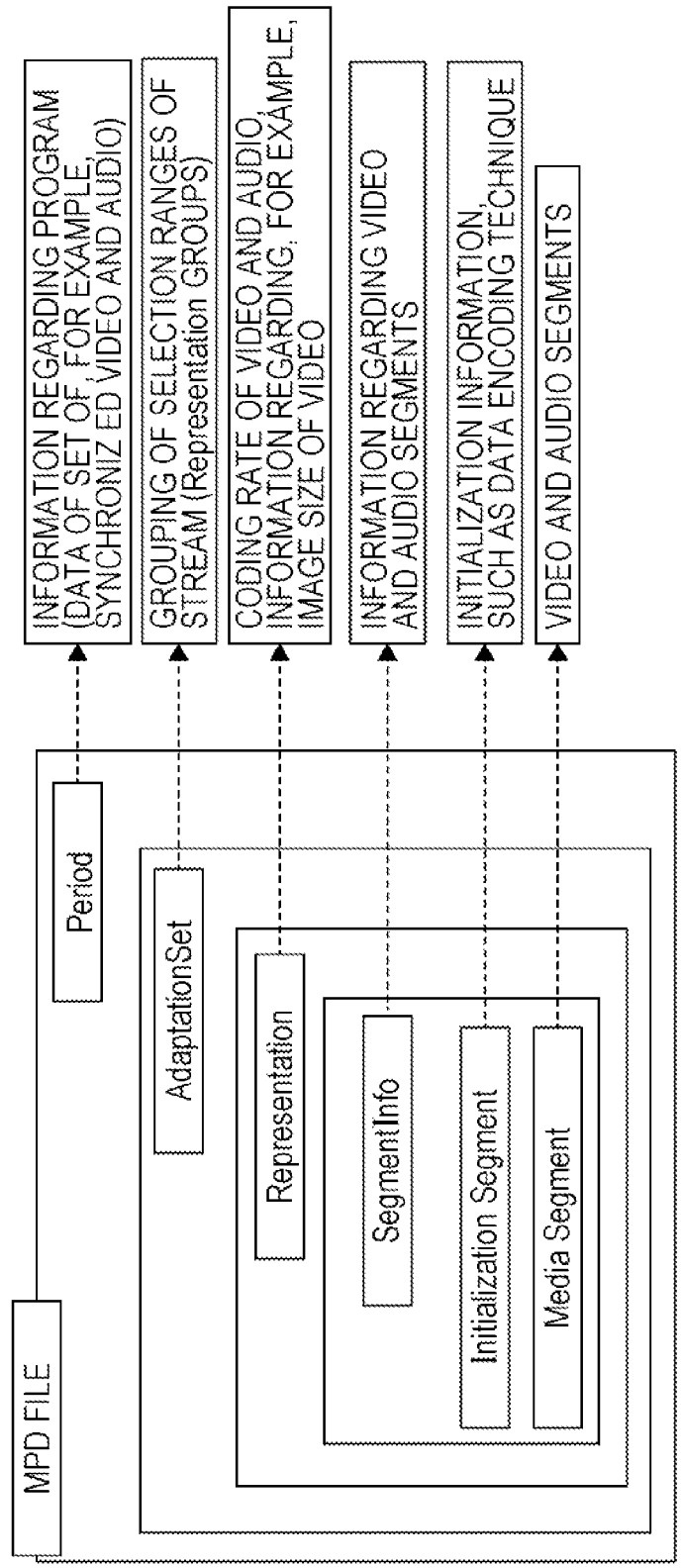
FIG. 2 illustrates a hierarchical structure of an MPD file.

As illustrated in FIG. 2, the MPD file has a hierarchical structure. The MPD file, which is in XML format, describes information regarding, for example, the encoding type, coding rate, image size, and language of a video stored in the DASH segment streamer 11. The MPD file hierarchically includes structures, such as Period, AdaptationSet, Representation, SegmentInfo, Initialization Segment, and Media Segment.

The Period structure includes information regarding a program (a set of, for example, synchronized video and audio data). In addition, the AdaptationSet structure included in the Period structure groups the selection ranges (Representation groups) of the stream. In addition, the Representation structure included in the AdaptationSet structure includes information regarding the coding rates of video and audio and the audio size of the video.

In addition, the SegmentInfo structure included in the Representation structure includes information regarding the segments of the video and audio. Furthermore, the Initialization Segment structure included in the SegmentInfo structure includes initialization information, such as a data encoding technique. Still furthermore, the Media Segment structure included in the SegmentInfo structure includes information, such as the address from which a video or audio segment is retrieved.

Figure 3:
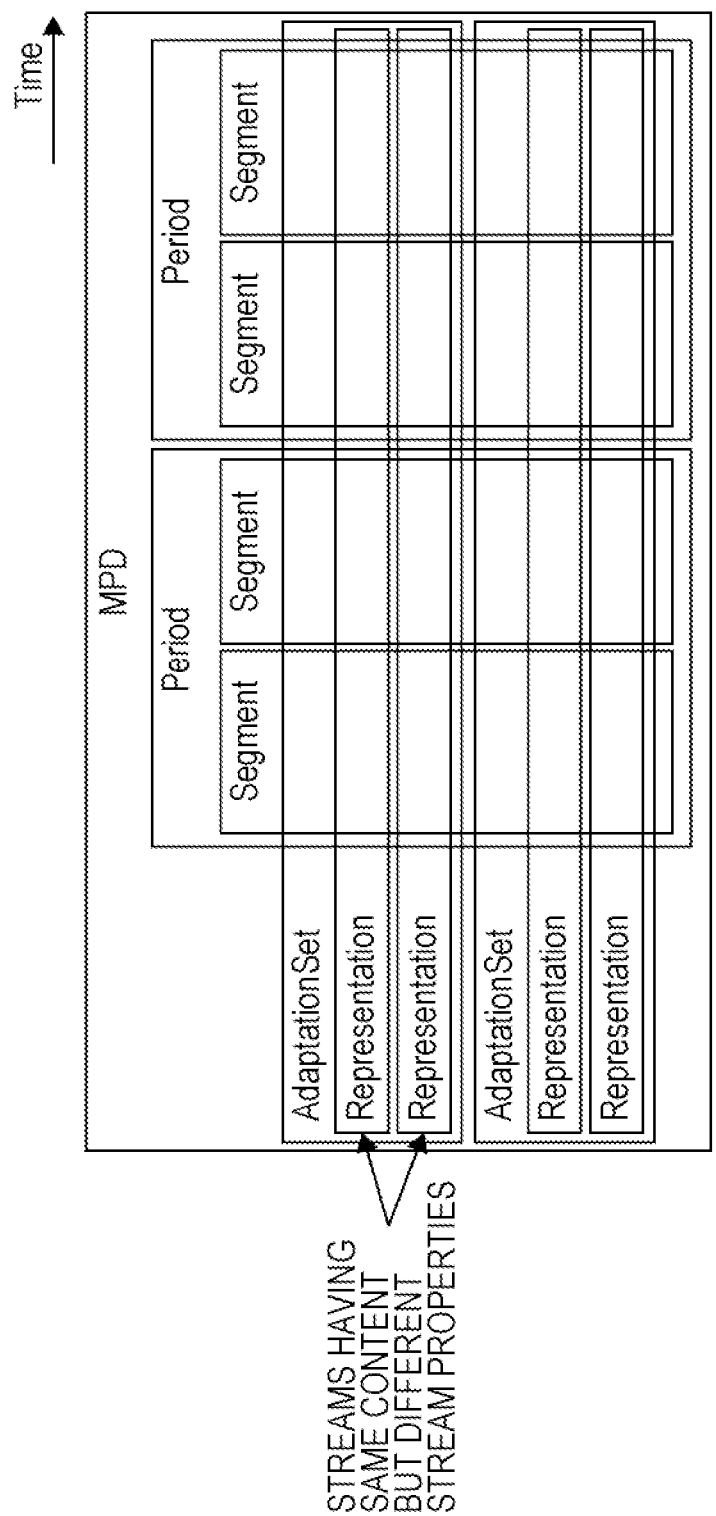
FIG. 3 illustrates an example of the structures included in the MPD file and arranged on a time axis.

FIG. 3 illustrates an example of the structures that are included in the above-described MPD file and that are arranged on a time axis. In this example, the MPD file includes two Periods, and each of the Periods includes two segments. In addition, in this example, each Period includes two AdaptationSets, and each AdaptationSet includes two Representations associated with streams having the same information except for stream properties.

Figure 4:
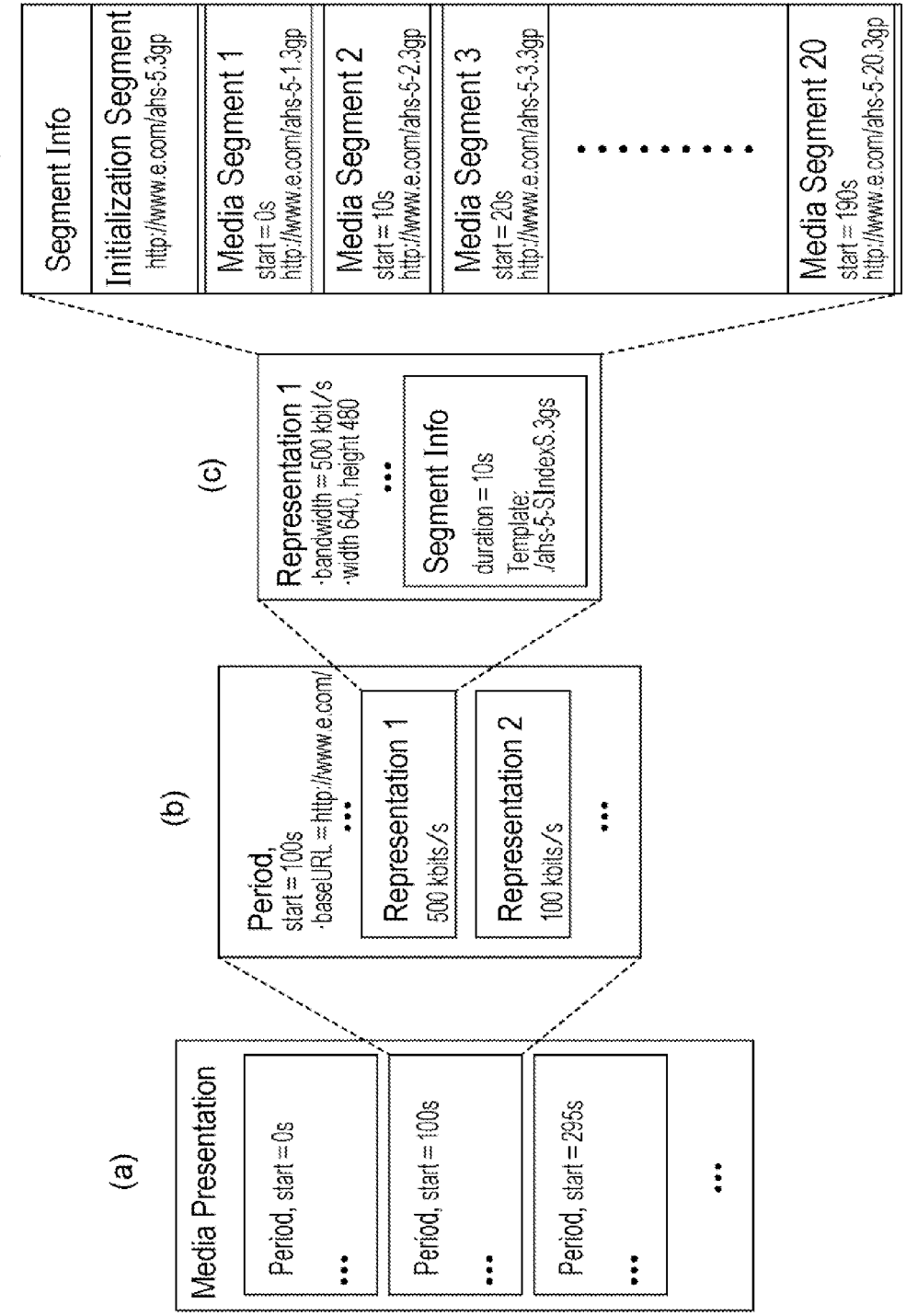
FIG. 4 illustrates an example of a relationship among the structures hierarchically disposed in the MPD file.

FIG. 4 illustrates an example of a relationship among the structures hierarchically disposed in the above-described MPD file. As illustrated in FIG. 4(*a*), Media Representation, which represents the entire MPD file, includes a plurality of Periods divided into time intervals. For example, a first Period starts at 0 second, and the next Period starts at 100 seconds and so on.

As illustrated in FIG. 4(*b*), Period includes a plurality of Representations. The plurality of Representations are grouped by the above-described AdaptationSet. A Representation group associated with video data streams having the same information except for different stream properties (e.g., the rate) is present. According to the present embodiment, a Representation group for the video data streams observed from different viewpoints is present.

As illustrated in FIG. 4(*c*), Representation includes SegmentInfo. As illustrated in FIG. 4(*d*), SegmentInfo includes Initialization Segment and a plurality of Media Segments each describing information regarding Segment generated by further dividing the Period. Media Segment includes, for example, information such as the address (url) used to actually retrieve the segment data of the video and audio.

Note that stream switching is freely performed among a plurality of Representations grouped in AdaptationSet. In this manner, a stream having an optimum rate for the conditions of the network environment in which the IPTV client is located can be selected and, thus, uninterrupted video delivery can be provided.

Figure 5:
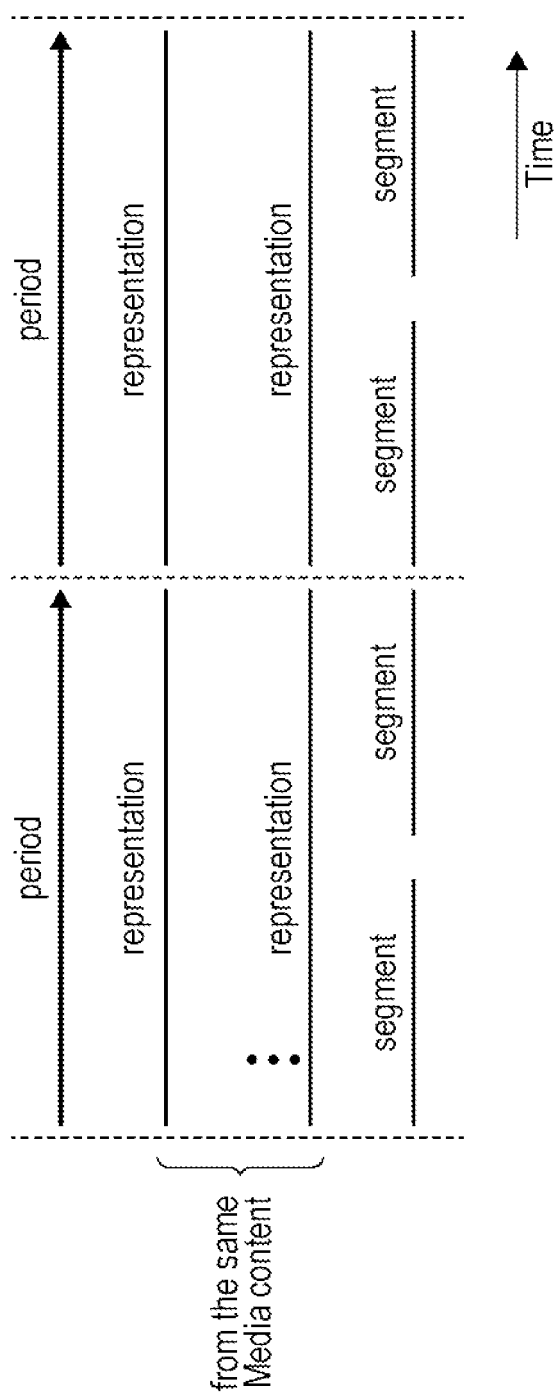
FIG. 5 illustrates an example of a relationship among Period, Representation, and Segment.

FIG. 5 illustrates an example of a relationship among Period, Representation, and Segment. In this example, an MPD file includes two Periods. Each of the Periods includes two Segments. In addition, in this example, each of the Periods includes a plurality of Representations associated with the same media content.

As described above, an MPD file includes information regarding, for example, the encoding type, coding rate, image size, and language of a video stored in the DASH segment streamer 11. According to the present embodiment, the DASH MPD server 12 sets, in the information regarding each of the video data streams, an index regarding a cache of the DASH segment of the video data stream in the CDN 14.

Figure 6:
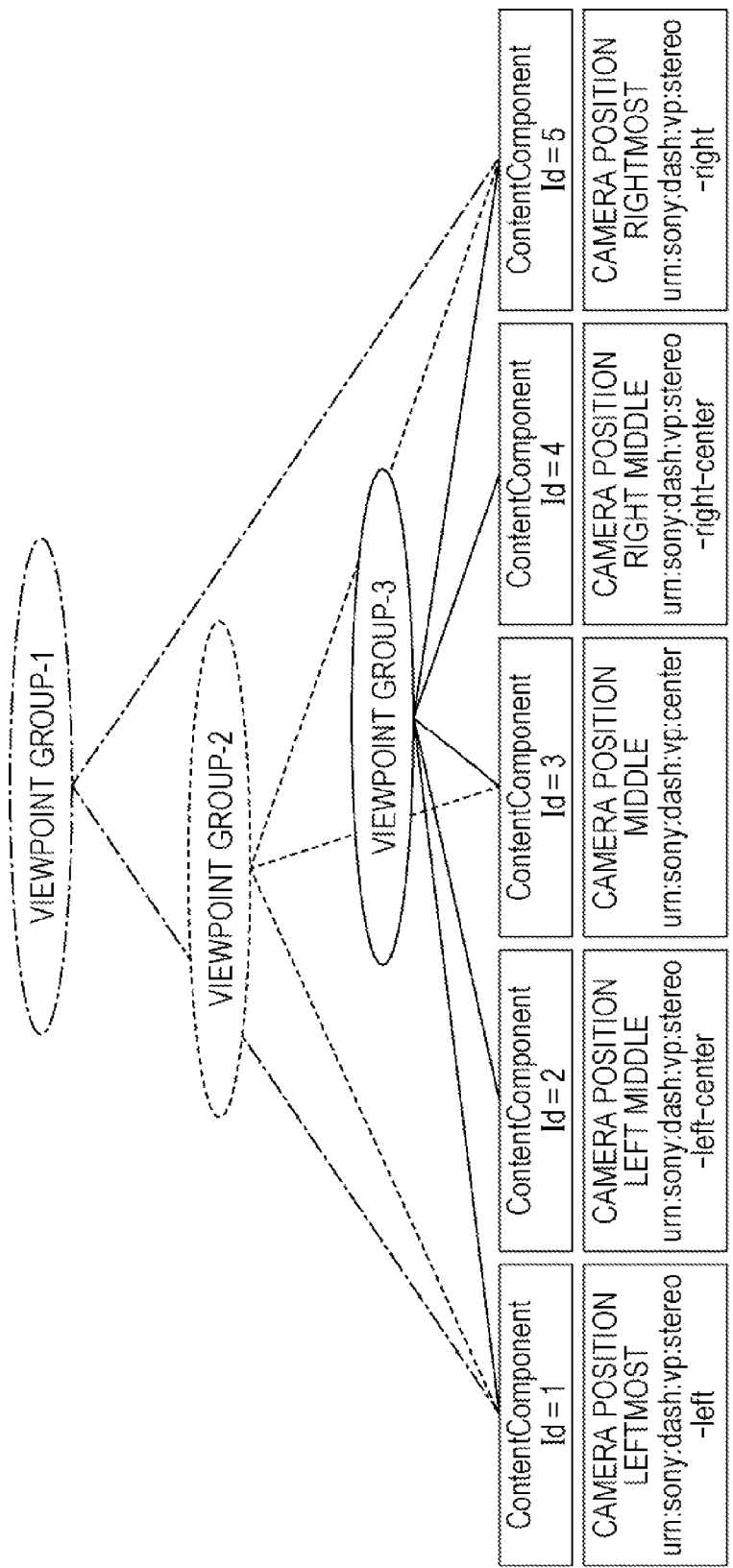
FIG. 6 illustrates an example of classification of multi-view video data streams into viewpoint groups.

The DASH MPD server 12 classifies the above-described plurality of viewpoints into a predetermined number of viewpoint groups on the basis of estimation of the frequency of delivery requests of the video data stream. Thereafter, the DASH MPD server 12 determines the index regarding a cache of the video data stream of each of the viewpoints. For example, as illustrated in FIG. 6, the DASH MPD server 12 classifies the five viewpoints, that is, the leftmost viewpoint, the left middle viewpoint, the middle viewpoint, the right middle viewpoint, and the rightmost viewpoint into three viewpoint groups, that is, a viewpoint group 1, a viewpoint group 2, and a viewpoint group 3.

The viewpoint group 1 includes two viewpoints, that is, the leftmost viewpoint and the rightmost viewpoint for which the frequency of a delivery request is estimated to be the highest. In addition, the viewpoint group 2 includes three viewpoints, that is, the leftmost viewpoint, the middle viewpoint, and the rightmost viewpoint for which the frequency of a delivery request is estimated to be the second highest.

Furthermore, the viewpoint group 3 includes five viewpoints, that is, the leftmost viewpoint, the left middle viewpoint, the middle viewpoint, the right middle viewpoint, and the rightmost viewpoint for which the frequency of a delivery request is estimated to be the lowest.

Note that the index regarding a cache indicates, for example, a cache priority and/or a cache expiry time of each of the multi-view video data streams in the CDN 14. For example, in terms of the cache priority, the priorities of the video data streams captured from the leftmost viewpoint and the rightmost viewpoint included in the viewpoint group 1 are set to "high". The priority of the video data stream captured from the middle viewpoint, which is added to the viewpoint group 2, is set to "middle". The priorities of the video data streams captured from the left middle viewpoint and the right middle viewpoint, which are added to the viewpoint group 3, are set to "low".

In addition, for example, in terms of the cache expiry time, the time for the video data streams obtained from the leftmost and the rightmost viewpoints included in the viewpoint group 1 is set to "long", and the time for the video data streams obtained from the left middle and the right middle viewpoints included in only the viewpoint group 3 is set to "short". Note that the MPD file is described in more detail below.

Figure 7:
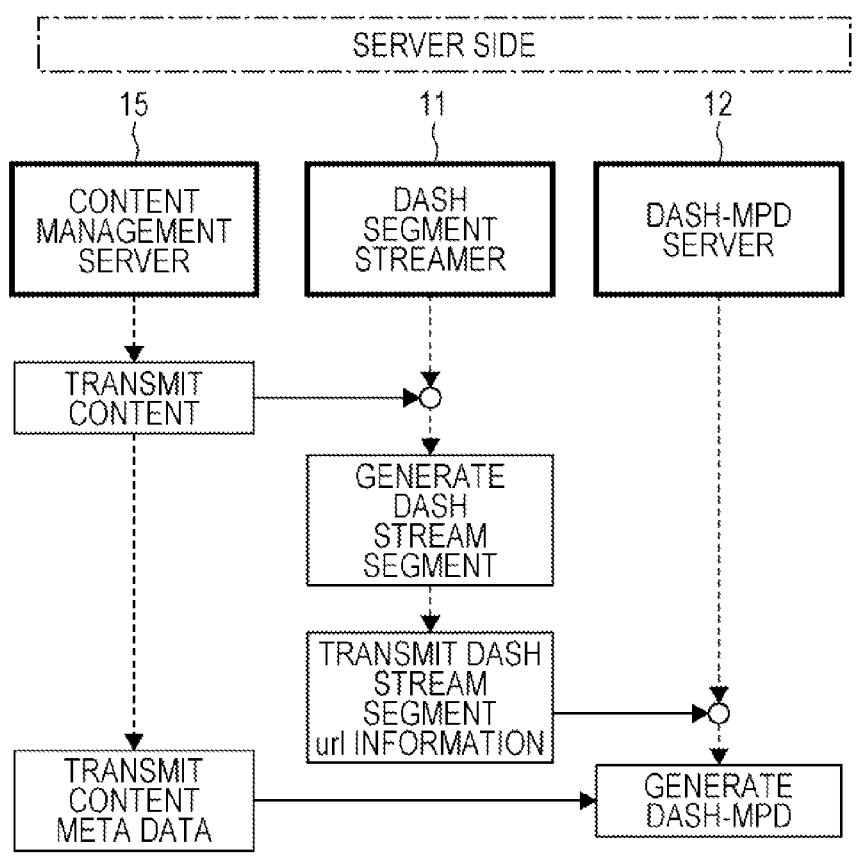
FIG. 7 is an example of the flow of a process performed until after a DASH segment and an MPD file have been generated from content.

FIG. 7 is an example of the flow of a process performed until after the DASH segment and the DASH MPD file have been generated from content. Content is transmitted from a content management server 15 to the DASH segment streamer 11. The DASH segment streamer 11 generates the DASH segment of each of the data streams on the basis of, for example, video data and audio data that constitute the content.

In addition, the DASH segment streamer 11 transmits, to the DASH MPD server 12, the address (url) information of the generated DASH segment of each of the data streams. The content management server 15 transmits the meta data of the content to the DASH MPD server 12. The DASH MPD server 12 generates an MPD file on the basis of the address information of the DASH segment of each of the data streams and the meta data of the content.

Figure 8:
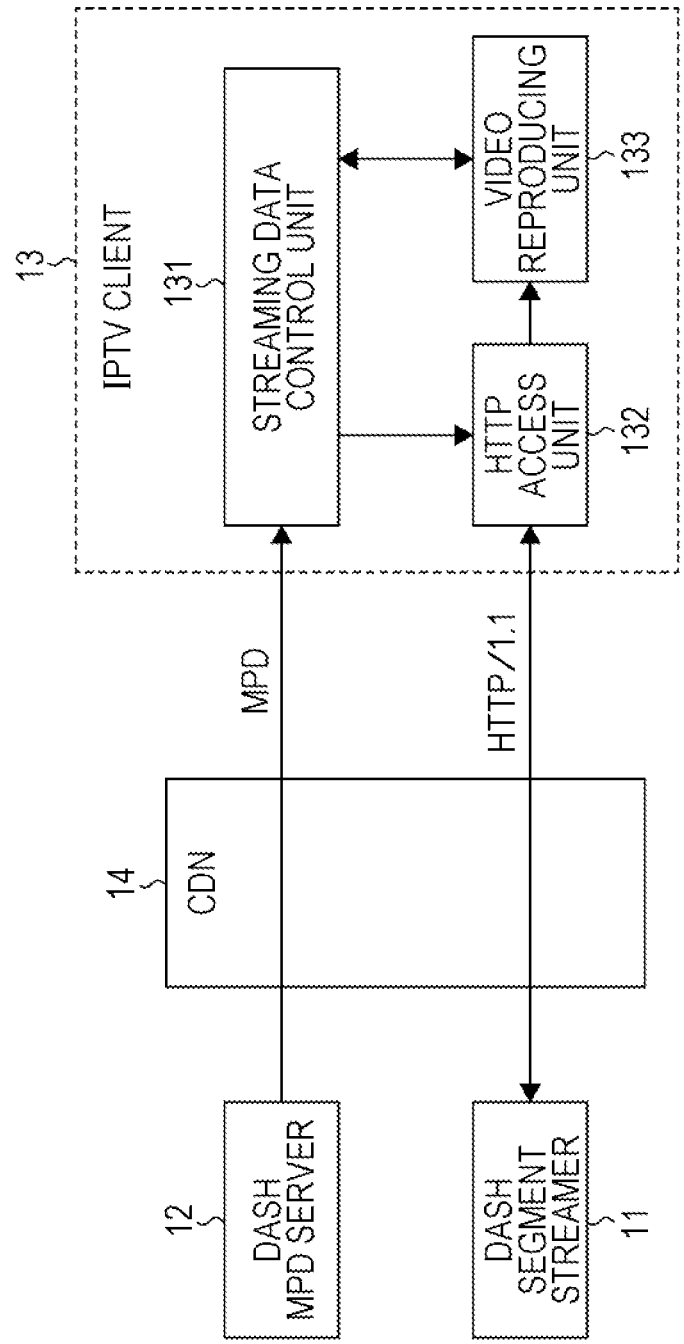
FIG. 8 illustrates an example of the configuration of an IPTV client

FIG. 8 illustrates an example of the configuration of the IPTV client 13 (13-1 to 13-N). The IPTV client 13 includes a streaming data control unit 131, an HTTP access unit 132, and a video reproducing unit 133. The streaming data control unit 131 acquires an MPD file from the DASH MPD server 12 and analyzes the information in the MPD file.

The HTTP access unit 132 requests the segments of the video and audio used for video reproduction to the DASH segment streamer 11. At that time, the HTTP access unit 132 additionally takes into account the screen size of the IPTV client 13 and the conditions of the transmission path and selects a stream having an image size and a coding rate optimum for the screen size of the IPTV client 13 and the conditions of the transmission path. For example, in the initial stage, the HTTP access unit 132 requests the segment of a stream having a low coding rate. Thereafter, if the communication condition is excellent, the HTTP access unit 132 requests the segment of a stream having a high coding rate.

The HTTP access unit 132 transmits the received segments of the video and audio to the video reproducing unit 133. The video reproducing unit 133 performs a decoding process on each of the segments transmitted from the HTTP access unit 132 and obtains one video content. Thus, the video reproducing unit 133 reproduces the video and audio.

Note that the processing is performed by each of the units of the IPTV client 13 through, for example, software.

According to the present embodiment, three classes of the performance of reproduction is provided for the IPTV client 13. For example, if the device grade is the lowest and, thus, image data of only two viewpoints, that is, the leftmost viewpoint and the rightmost viewpoint are processed, the segments of the video data streams from the two viewpoints are requested. Thus, a three-dimensional image based the video data of the two viewpoints is reproduced.

In addition, when, for example, image data of three viewpoints, that is, the leftmost viewpoint, the middle viewpoint, and the rightmost viewpoint are processed by an IPTV client 13 having a medium device grade, the segments of the video data streams of the three viewpoints are requested. Thus, a three-dimensional image based on the video data of the three viewpoints is reproduced. Furthermore, when, for example, image data of five viewpoints, that is, the leftmost viewpoint, the left middle viewpoint, the middle viewpoint, the right middle viewpoint, and the rightmost viewpoint are processed by an IPTV client 13 having the highest device grade, the segments of the video data streams of the five viewpoints are requested. Thus, a three-dimensional image based on the video data of the five viewpoints is reproduced.

Figure 9:
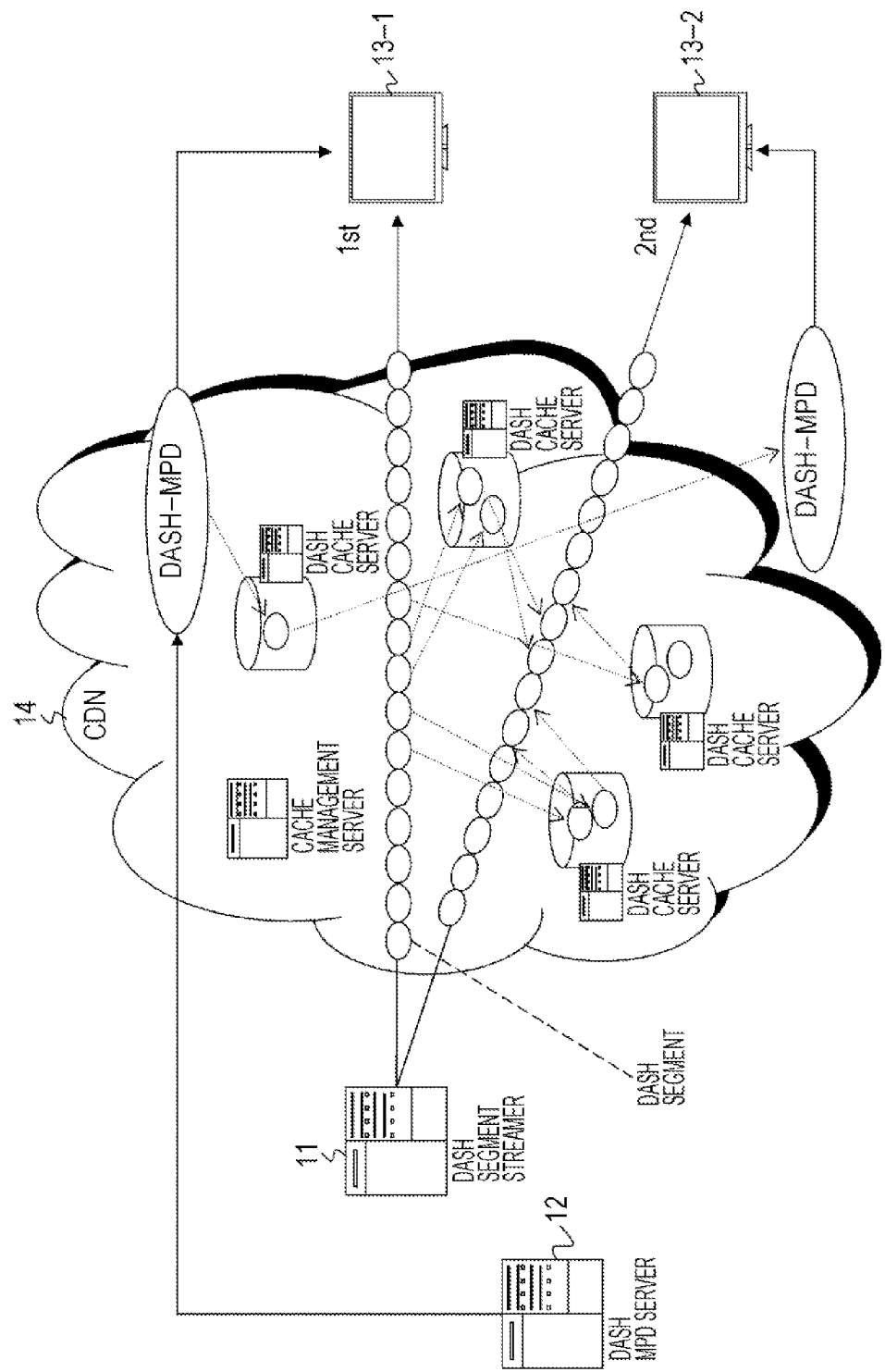
FIG. 9 illustrates the whole of a widely used DASH-based stream delivery system.

FIG. 9 illustrates the whole of a widely used DASH-based stream delivery system. All of DASH MPD files and DASH segments are delivered via the CDN (Content Delivery Network) 14. The CDN 14 has a configuration in which a plurality of cache servers (DASH cache servers) are network-arranged.

Each of the cache servers receives an HTTP request for acquiring the MPD file from the IPTV client 13. If the MPD file is contained in a local MPD cache, the cache server returns the MPD file to the IPTV client 13 in the form of an HTTP response. However, if the MPD file is not contained in the local MPD cache, the cache server forwards the request to the DASH MPD server 12 or a higher-layer cache server. Thereafter, upon receiving an HTTP response including the MPD file, the cache server forwards the HTTP response to the IPTV client 13. At the same time, the cache server performs a cache process.

In addition, the cache server receives an HTTP request for acquiring a DASH segment from the IPTV client 13. If the DASH segment is contained in a local segment cache, the cache server returns the DASH segment to the IPTV client 13 in the form of an HTTP response. However, if the DASH segment is not contained in the local segment cache, the cache server forwards the request to the DASH segment streamer 11 or a higher-layer cache server. Thereafter, upon receiving an HTTP response including the DASH segment, the cache server forwards the HTTP response to the IPTV client 13. At the same time, the cache server performs a cache process.

In the CDN 14, the DASH segment to be delivered to the IPTV client 13-1 that transmitted an HTTP request first is temporarily cached by the cache server located in the path. If an HTTP request is subsequently transmitted from the IPTV client 13-2, the cached DASH segment is delivered. Accordingly, the delivery efficiency of HTTP streaming to a plurality of IPTV clients can be improved.

According to the present embodiment, the CDN 14 includes a predetermined number of cache management servers in addition to the plurality of cache servers. Each of the cache management servers generates a cache control policy on the basis of the index regarding a cache of the DASH segment of each of the video data streams included in the MPD file. Thereafter, the cache management server distributes the cache control policy to the cache servers. The cache servers performs a caching process of the DASH segment of each of the video data streams.

[Insertion of Variety of Information into MPD File]

[Insertion of Viewpoint Information]

According to the present embodiment, the MPD file includes information regarding the multi-view video data streams that constitute a three-dimensional image, for example, video data streams from five viewpoints, that is, the leftmost viewpoint, the left middle viewpoint, the middle viewpoint, the right middle viewpoint, and the rightmost viewpoint. The DASH MPD server sets the viewpoint information in the MPD file using a DescriptorType element.

In DASH, by using an element called "DescriptorType", a new dictionary and a new vocabulary reference can be added. The dictionary and the vocabulary reference is specified by a schema URI (or a set of a schema URI and the value defined in the dictionary schema).

FIG. 10 illustrates the definition of the DescriptorType element. The properties of schema URI (@schemeIdUri) and a value (@value) can be set under DescriptorType. The property of the schema URI indicates URN or URL specifying the dictionary schema (the name space). The property of the value indicates a value defined in the dictionary schema specified by the schema URI.

As described above, according to the present embodiment, a ViewPoint element serving as an element indicating a "viewpoint" is defined using the DescriptorType element. FIG. 11 illustrates the definition of the ViewPoint element. The property of Schema URI under the viewpoint type indicates a URN or URL specifying the dictionary schema (the name space) that defines the viewpoint. The value property under the viewpoint type indicates the value defined in the dictionary schema specified by the schema URI.

Here, for example, the viewpoint dictionary is defined using the dictionary schema (the name space) "urn:aaaa:dash:vp" as illustrated in FIG. 12. In this viewpoint dictionary, the URN "urn:aaaa:dash:vp:stereo-right" corresponds to the entry of the dictionary "rightmost". The URN "urn:aaaa:dash:vp:stereo-left" corresponds to the entry of the dictionary "leftmost". The URN "urn:aaaa:dash:vp:center" corresponds to the entry of the dictionary "middle". The URN "urn:aaaa:dash:vp:stereo-right-center" corresponds to the entry of the dictionary "right middle". The URN "urn:aaaa:dash:vp:stereo-left-center" corresponds to the entry of the dictionary "left middle".

Figure 13:
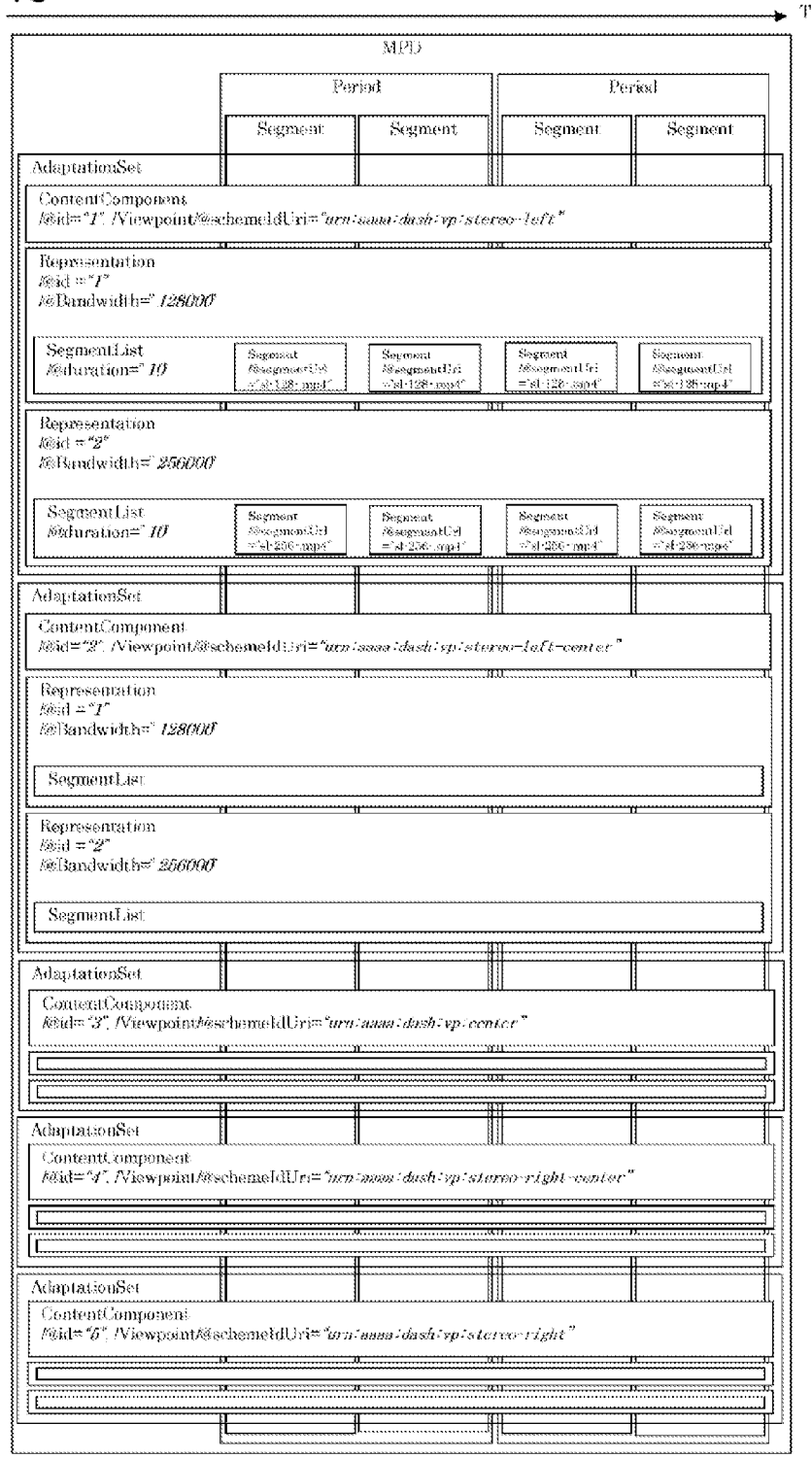
FIG. 13 illustrates an example of an MPD file in the case in which a ViewPoint element is defined and viewpoint information is set in the information regarding video data streams from the viewpoints.

FIG. 13 illustrates an example of an MPD file in the case in which a ViewPoint element is defined and the viewpoint information is set in the information regarding the video data streams of the viewpoints. In such a case, the ViewPoint element is placed in a ContentComponent element.

As a ViewPoint element, @schemeIdUri="urn:aaaa:dash:vp:stereo-left" is set in ContentComponent inside the AdaptationSet that groups the Representations including the information corresponding to the video data stream observed from the leftmost viewpoint. This description implies that the information in this AdaptationSet corresponds to the video data stream observed from the leftmost viewpoint. Note that although the following description is not intended to be all-inclusive, a ViewPoint element is similarly placed in ContentComponent inside the AdaptationSet including the information regarding another viewpoint so as to indicate the viewpoint.

[Insertion of Cache Priority Index]

The case in which the reproduction performance of the IPTV client 13 is classified into three classes, as described above, is discussed below. In general, a device having the lowest processing power (a class-1 device), which is the most widely used, generates an image on the basis of video data streams from two viewpoints, that is, the leftmost viewpoint and the rightmost viewpoint.

In addition, a device having medium processing power (a class-2 device) generates an image on the basis of video data streams from three viewpoints, that is, the leftmost viewpoint, the middle viewpoint, and the rightmost viewpoint. Furthermore, a device having the highest processing power (a class-3 device), which is the least widely used, generates an image on the basis of video data streams from five viewpoints, that is, the leftmost viewpoint, the left middle viewpoint, the middle viewpoint, the right middle viewpoint, and the rightmost viewpoint. In this manner, the number of types of stream to be processed increases with increasing processing power of a device.

In general, widely used CDNs have a capability of actively pre-caching a DASH segment that is likely to be accessed in advance. In such a case, if it is assumed that all of the IPTV clients 13 are class-3 devices and, thus, the DASH segments of five viewpoints are pre-cached for all of content, the following issue arises. That is, overload may occur in a replication process into the cache server, or an insufficient resource problem, that is, insufficient storage capacity may occur. Thus, it may be difficult to deliver content at a cost appropriate to the service requirement.

To solve such a problem, it is desirable that the CDN expansion priority of a DASH segment be ranked in accordance with the type of viewpoint group. For example, the CDN expansion priorities of video data streams that are observed from the leftmost viewpoint and the rightmost viewpoint and that are processed by devices that are likely to be the most widely used (class-1 devices) are increased to the highest level. The CDN expansion priorities of video data streams processed by class-2 devices are increased to the second highest level. The CDN expansion priorities of video data streams processed by class-3 devices are increased to the third highest level.

By setting the CDN expansion priorities in the MPD file, the processing described below is available and, thus, the cost performance of the resource utilization efficiency of a CDN can be increased without decreasing the service provision efficiency of the CDN for the end users (e.g., the speed until after streaming has started).

For example, by setting the CDN expansion priority in the MPD file, a server that manages the CDN cache policy can analyze the MPD of content to be delivered in advance and sequentially assign a replication capacity to a stream that is likely to be accessed by a large number of clients first.

In addition, for example, by setting the CDN expansion priority in the MPD file, the replication process can be prioritized (e.g., the assignment priority of a CPU resource can be controlled), and the replication storage area can be prioritized in accordance with the access performance (storage staging priority control can be performed for, for example, an on memory, an SSD (a flash memory drive), and an HD).

According to the present embodiment, as the index regarding the cache of the DASH segment, the DASH MPD server 12 sets the index of a cache priority (the CDN expansion priority) in the information regarding each of the multi-view video data streams using the DescriptorType element.

According to the present embodiment, by using the above-described DescriptorType element, the "CDN expansion priority", that is, CacheParameter element is defined as an element indicating the cache priority. FIG. 14 illustrates the definition of the CacheParameter element. The schema URI property under the cache parameter type indicates a URN or URI specifying the dictionary schema (the name space) defining the cache parameter. The value property under the cache parameter type indicates the value defined in the dictionary schema specified by the schema URI.

Herein, for example, a cache parameter dictionary is defined by setting the dictionary schema (the name space) to "urn:aaaa:dash:cp", as illustrated in FIG. 15. In this cache parameter dictionary, the URN "urn:aaaa:dash:cp:high" corresponds to the entry of the dictionary "high". The URN "urn:aaaa:dash:cp:middle" corresponds to the entry of the dictionary "middle". The URN "urn:aaaa:dash:cp:low" corresponds to the entry of the dictionary "low".

Figure 16:
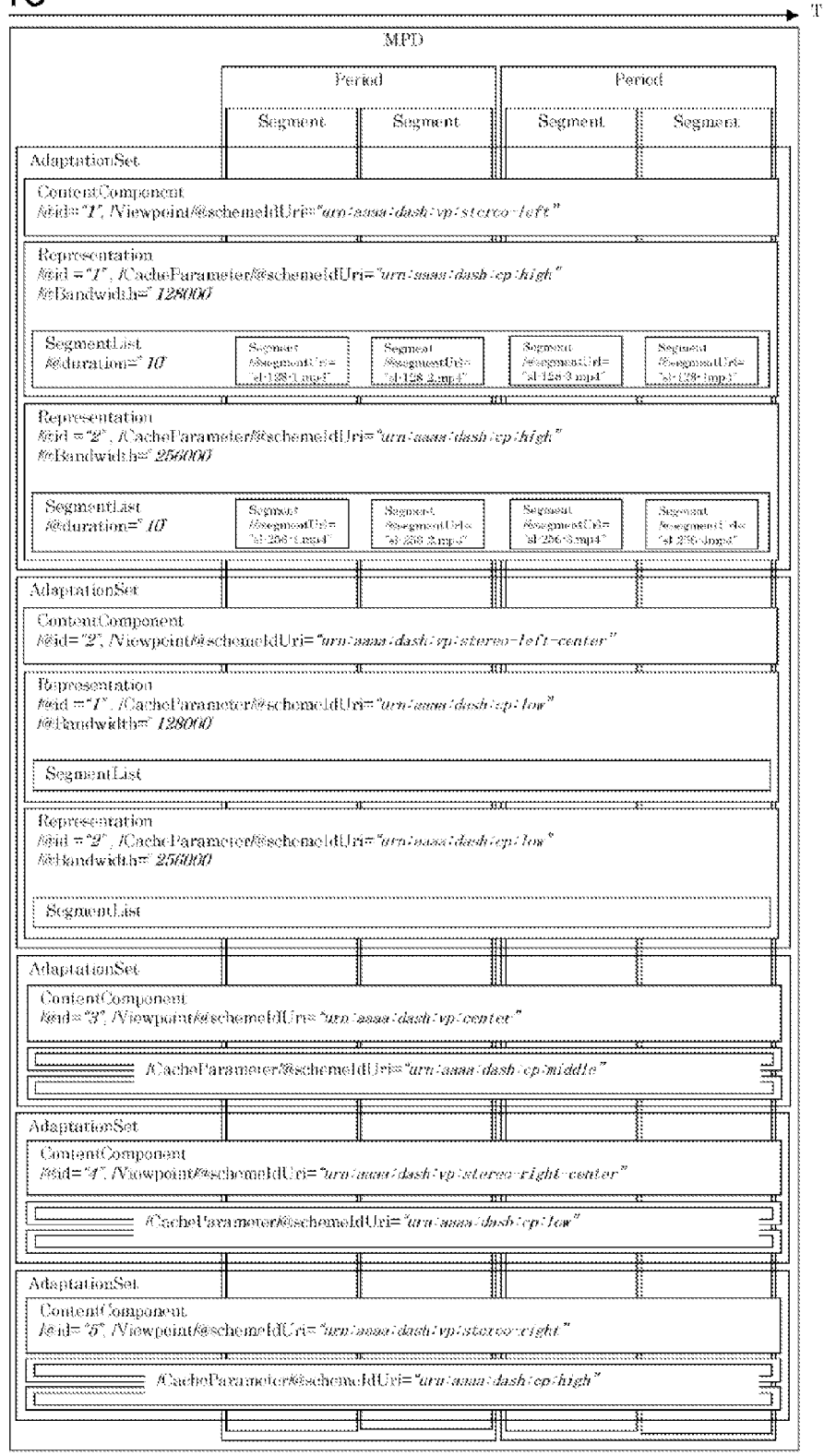
FIG. 16 illustrates an example of the MPD file in the case in which a CacheParameter element is defined and the index of a cache priority is set in the information regarding a video data stream of each of the viewpoints.

FIG. 16 illustrates an example of the MPD file in the case in which a CacheParameter element is defined and the index of the cache priority is set in the information regarding each of the multi-view video data streams. In such a case, the CacheParameter element is placed in the Representation element.

As a CasheParameter element, @schemeIdUri="urn:aaaa:dash:cp:high" is set in each of the Representations including the information corresponding to the video data stream from the leftmost viewpoint. This implies that the cache priority (the CDN expansion priority) of the video data stream from the leftmost viewpoint is "high".

Note that although detailed the following description is not intended to be all-inclusive, a CasheParameter element is similarly placed in each of the Representations including the information regarding the other viewpoints and, thus, the cache priorities are indicated. That is, it is indicated that the cache priority of each of the video data streams from the left middle viewpoint and the right middle viewpoint is "low". In addition, it is indicated that the cache priority of the video data stream from the middle viewpoint is "middle". Furthermore, it is indicated that the cache priority of the video data stream from the rightmost viewpoint is "high".

[Insertion of Cache Expiry Time Index]

According to the present embodiment, the DASH MPD server 12 further sets the index of a cache expiry time in the MPD file using the above-described CacheParameter element. That is, as illustrated in FIG. 17, the DASH MPD server 12 additionally defines, as an example of a cache parameter, the entry of the dictionary schema indicating whether the expiry time of the cache server in the CDN is long or short. In this cache parameter dictionary (addition), the entry of URN of "urn:aaaa:dash:cp:long" corresponds to the entry of the dictionary "long". The entry of URN of "urn:aaaa:dash:cp:short" corresponds to the entry of the dictionary "short".

Figure 18:
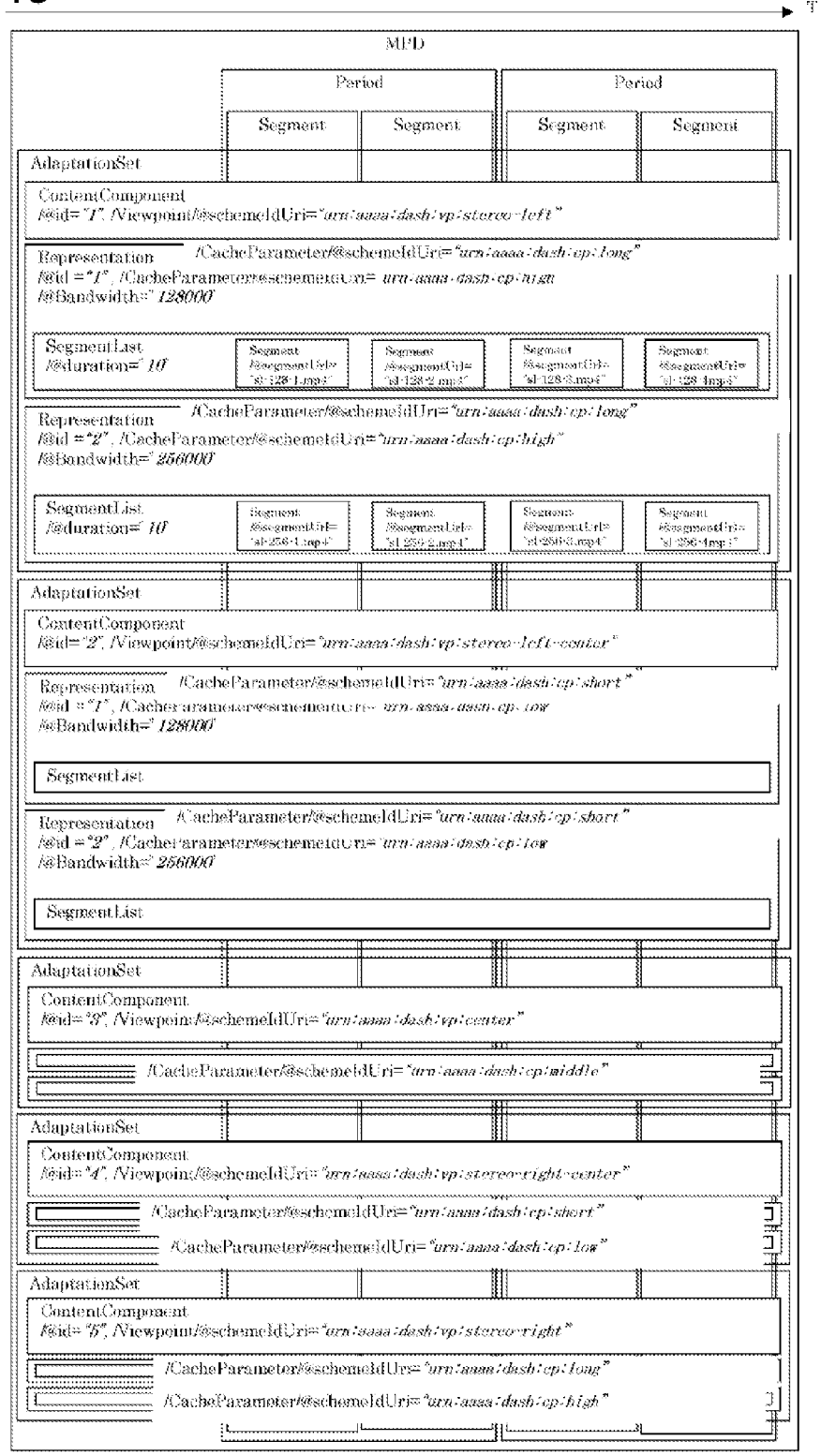
FIG. 18 illustrates an example of the MPD file in the case in which the CacheParameter element is defined and the index of a cache expiry time is set in the information regarding each of the multi-view video data streams in addition to the index of a cache priority.

FIG. 18 illustrates an example of the MPD file in the case in which the CacheParameter element is defined and the index of the cache expiry time is set in the information regarding each of the multi-view video data streams in addition to the index of the cache priority. In such a case, the CacheParameter element is placed in the Representation element.

As a CasheParameter element, @schemeIdUri="urn:aaaa:dash:cp:long" is set in each of the Representations having the information corresponding to the video data stream from the leftmost viewpoint. This implies that the cache expiry time of the video data stream from the leftmost viewpoint is "long".

Note that although the following description is not intended to be all-inclusive, a CasheParameter element is similarly placed in each of the Representations including the information regarding the other viewpoints and, thus, the cache expiry times are indicated. That is, it is indicated that the cache expiry times of each of the video data streams from the left middle viewpoint and the right middle viewpoint is "short". In addition, the cache expiry time of the video data stream from the middle viewpoint is not specified. In this case, the cache server can select any cache processing policy.

[Cache Control in CDN]

The CDN 14 has a predetermined number of cache management servers disposed therein in addition to a plurality of cache servers (refer to FIG. 9). The cache management server generates a cache control policy on the basis of the above-described index of a cache set in the MPD file and distributes the generated cache control policy to the cache servers in the CDN 14. Each of the cache servers performs a caching process (an acquisition process and a replication process) on the DASH segment on the basis of the distributed cache control policy.

For example, if a request for a first MPD file is sent from an IPTV client (a DASH client) 13, a first cache server (an edge server) in the CDN 14 that serves as mediator of the MPD file acquires the requested MPD file from the DASH MPD server 12. At that time, the cache server transmits the MPD file to the cache management server. The cache management server analyzes the received MPD file and generates a cache control policy on the basis of the indices regarding cache. Thereafter, the cache management server sends the cache control policy to the cache servers in the CDN 14.

In addition, for example, the cache management server actively acquires the MPD file by using, for example, a crawler before the IPTV client 13 sends a first MPD request. Thereafter, the cache management server analyzes the acquired MPD file and generates a cache control policy on the basis of the index regarding cache. Thereafter, the cache management server sends the cache control policy to the cache servers in the CDN 14.

The cache control policy contains a list of a class indicated by the index regarding cache with a corresponding url or a corresponding url regular expression. For example, if the MPD file includes the above-described index of the cache priority and the index of the cache expiry time as the indices regarding cache, the cache control policy contains each of the classes indicated by the indices with a corresponding url (or a list including the regular expression), as illustrated in FIG. 19.

Figure 21:
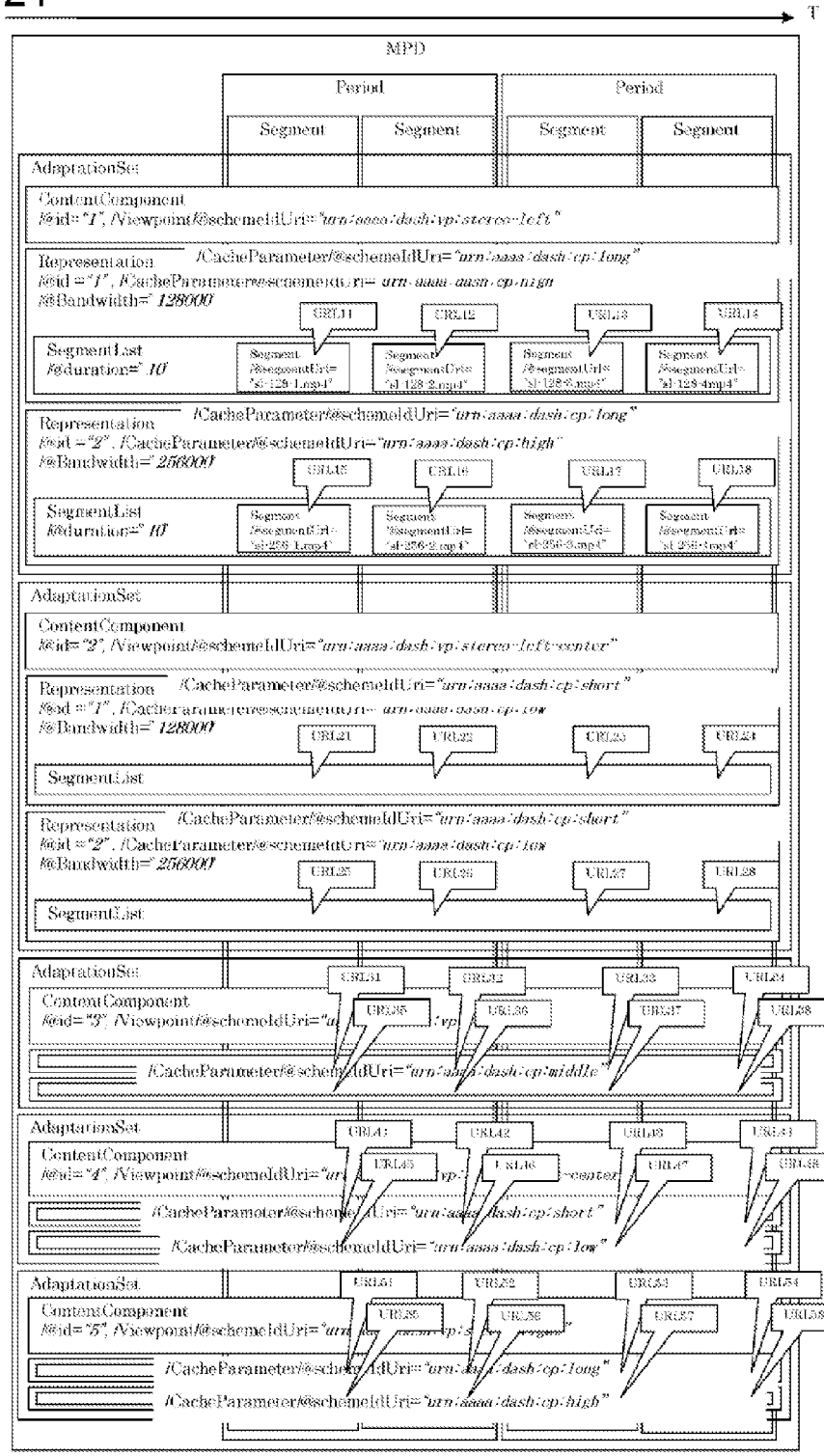
FIG. 21 illustrates an example of assignment of a url to one of the DASH segments.

FIG. 20 illustrates an example of a cache control policy. In this example, the cache control policy is used when the MPD file includes the index of the cache priority and the index of the cache expiry time as illustrated above in FIG. 18 and if an url is assigned to each of the DASH segments as illustrated in FIG. 21.

In this cache control policy, the urls assigned to the DASH segments of the video data streams from the leftmost viewpoint and the rightmost viewpoint are included in a section in which the priority is "high" and the expiry time is "long". In addition, in the cache control policy, the urls assigned to the DASH segments of the video data streams from the middle viewpoint are included in a section in which the priority is "middle" and the expiry time is "not specified (N/A)". Furthermore, in the cache control policy, the urls assigned to the DASH segments of the video data streams from the left middle viewpoint and the right middle viewpoint are included in a section in which the priority is "low" and the expiry time is "short".

An example of a caching process performed by the cache server that has received a distributed cache control policy is described next with reference to FIG. 22. (a) The cache management server distributes a cache control policy to the cache servers. (b) If the IPTV client 13 sends an acquisition request for the DASH segment at "urlxx", (c) The cache server that has received the acquisition request determines whether the local cache contains the DASH segment at "urlxx".

(d) If the local cache contains the DASH segment at "urlxx", the cache server returns the DASH segment to the IPTV client 13. (e) However, if the local cache does not contain the DASH segment at "urlxx", the cache server sends the acquisition request to the DASH segment streamer 11. (f) The DASH segment streamer 11 returns the DASH segment to the IPTV client 13 via the cache server. (g) The IPTV client that has received the DASH segment at "urlxx" via the cache server reproduces the video on the basis of the DASH segment.

(h) After returning the DASH segment to the IPTV client 13, the cache server performs a caching process of the DASH segment on the basis of the caching control policy. That is, in step ST1, the cache server determines whether the priority of "urlxx" is "high". If the priority of "urlxx" is "high", the cache server determines in step ST2 whether the expiry time of "urlxx" is "long". If the expiry time of "urlxx" is "long", the cache server starts storing the DASH segment of "urlxx" in a local cache (an on memory) for a long-term period in step ST3.

However, if, in step ST1, the priority of "urlxx" is not "high" or if, in step ST2, the expiry time of "urlxx" is not "long", the cache server determines in step ST4 whether the priority of "urlxx" is "middle". If the priority of "urlxx" is "middle", the cache server determines in step ST5 whether the expiry time of "urlxx" is "not specified (N/A)". If the expiry time of "urlxx" is "not specified (N/A)", the cache server starts storing the DASH segment of "urlxx" in a local cache (an SSD) for a medium-term period in step ST6.

However, if, in step ST4, the priority of "urlxx" is not "middle" or if, in step ST5, the expiry time of "urlxx" is not "not specified (N/A)", the cache server determines in step ST7 whether the priority of "urlxx" is "low". If the priority of "urlxx" is "low", the cache server determines in step ST8 whether the expiry time of "urlxx" is "short". If the expiry time of "urlxx" is "short", the cache server starts storing the DASH segment of "urlxx" in a local cache (an HD) for a short-term period in step ST9.

However, if, in step ST7, the priority of "urlxx" is not "low" or if, in step ST8, the expiry time of "urlxx" is not "short", the cache server discards the DASH segment at "urlxx" in step ST10.

[Operation Performed by Stream Delivery System]

Figure 23:
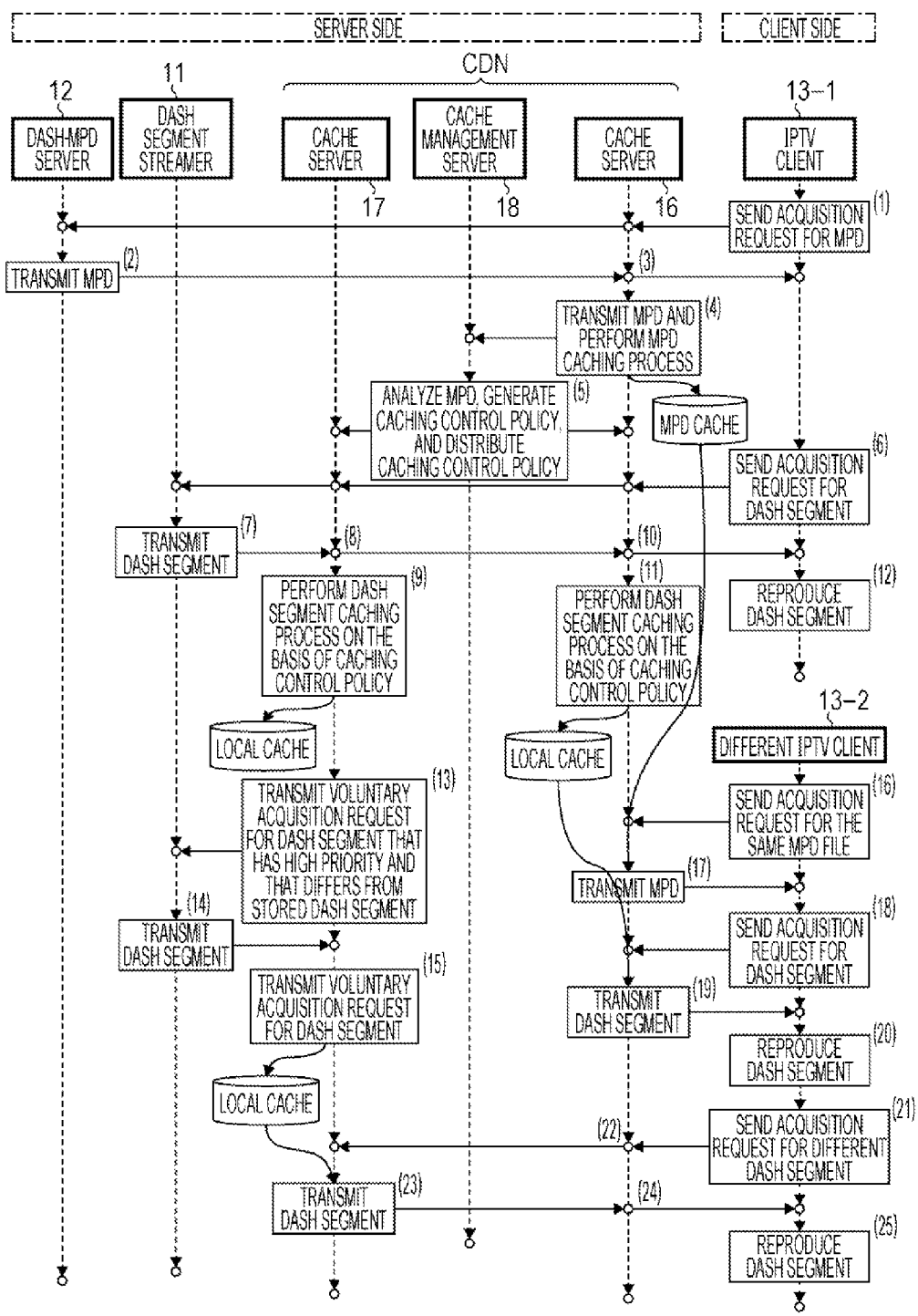
FIG. 23 illustrates an example of the operation performed by an IPTV client from the time the IPTV client requests an MPD file to the time the IPTV client reproduces the content (the DASH segment).

An example of the operation performed from the time an IPTV client 13 request an MPD file to the time the IPTV client reproduces the content (the DASH segment) is described next with reference to FIG. 23. Note that in the illustrated example, for simplicity, the CDN includes only two cache servers 16 and 17 and a cache management server 18.

(1) An IPTV client 13-1 sends an acquisition request for the MPD file associated with given content to the DASH MPD server 12 via the cache server 16 in the CDN. (2) The DASH MPD server 12 transmits the MPD file to the cache server 16 in the CDN in response to the acquisition request. As described above, the MPD file includes the index of a cache priority and the index of a cache expiry time.

(3) The cache server 16 transmits the MPD file to the IPTV client 13-1. (4) In addition, the cache server 16 performs a caching process so as to store the MPD file in an MPD cache and transmits the MPD file to the cache management server 18. (5) The cache management server 18 analyzes the MPD file, generates a caching control policy, and sends the caching control policy to the cache servers 16 and 17.

(6) Upon receiving the MPD file, the IPTV client 13-1 transmits the DASH segment (the stream segment) used for reproducing the given content to the DASH segment streamer 11 via the cache servers 16 and 17 in the CDN on the basis of the MPD file. In such a case, the IPTV client 13-1 can select an optimum rate and an optimum viewpoint group in accordance with the device power of the IPTV client 13-1 and the conditions of the network environment in which the IPTV client 13-1 is located.

(7) In response to the acquisition request, the DASH segment streamer 11 transmits the DASH segment to the cache server 17. (8) The cache server 17 transmits the DASH segment to the cache server 16. (9) In addition, the cache server 17 performs a caching process so as to store the DASH segment in a local cache on the basis of the caching control policy.

(10) Upon receiving the DASH segment from the cache server 17, the cache server 16 transmits the DASH segment to the IPTV client 13-1. (11) In addition, the cache server 16 performs a caching process so as to store the DASH segment in a local cache on the basis of the caching control policy. (12) Upon receiving the DASH segment, the IPTV client 13-1 performs a decoding process on the DASH segment and reproduces the video and audio of the given content.

(13) The cache server 17 transmits a voluntary acquisition request for a DASH segment that has a high priority and that differs from the DASH segment stored in the local cache to the DASH segment streamer 11 on the basis of the caching control policy. (14) In response to the acquisition request, the DASH segment streamer 11 transmits the DASH segment to the cache server 17. (15) The cache server 17 performs a caching process so as to store the DASH segment in a local cache.

(16) The IPTV client 13-2 sends, to the cache server 16 in the CDN, an acquisition request for the MPD file that is the same as the acquisition request requested by the IPTV client 13-1 in the above-described manner. (17) Since the cache server 16 stores the MPD file in an MPD cache, the cache server 16 transmits the MPD file to the IPTV client 13-2.

(18) Upon receiving the MPD file, the IPTV client 13-2 transmits, to the cache server 16 in the CDN, an acquisition request for the DASH segment (the stream segment) that is the same as the DASH segment requested by the IPTV client 13-1 in the above-described manner on the basis of the received MPD file. (19) Since the cache server 16 stores the DASH segment in the local cache, the cache server 16 transmits the DASH segment to the IPTV client 13-2. (20) Upon receiving the DASH segment, the IPTV client 13-2 performs a decoding process on the DASH segment and reproduces the video and audio of the given content.

(21) Subsequently, the IPTV client 13-2 sends an acquisition request for another DASH segment to the cache server 16. (22) Since the cache server 16 does not store the DASH segment in the local cache, the cache server 16 forwards the acquisition request for the DASH segment to the cache server 17.

(23) Since the cache server 17 stores the DASH segment in the local cache, the cache server 17 transmits the DASH segment to the cache server 16. (24) Subsequently, the cache server 16 transmits the DASH segment to the IPTV client 13-2. (25) Upon receiving the DASH segment, the IPTV client 13-2 performs a decoding process on the DASH segment and reproduces the video and audio of the given content.

As described above, in the stream delivery system 10 illustrated in FIG. 1, the MPD file provided from the DASH MPD server 12 includes the index regarding a cache, such as the index of the cache priority or the cache expiry time for each of the DASH segments. The cache management server in the CDN 14 generates a cache control policy on the basis of the index regarding cache and distributes the generated cache control policy to the cache servers.

Each of the cache servers in the CDN 14 performs a caching process of the DASH segment on the basis of the cache control policy. In this manner, among the cache servers in the CDN 14, a DASH segment having a higher priority is stored in the local caches of a larger number of the cache servers.

Accordingly, for the DASH segments of video data streams included in, for example, the viewpoint group 1, for which the IPTV client 13 is likely to send the acquisition request many times, the probability of the DASH segment being transmitted from the cache server in the CDN 14 rather than the DASH segment streamer 11 in response to the acquisition request for the DASH segment from the IPTV client 13 becomes high. Accordingly, the CDN 14 can efficiently perform a cache and delivery resource management of the DASH segment of video data streams.

<2. Modifications>

Note that according to the above-described embodiment, examples of the index regarding a cache that is set in the MPD file include the index of the cache priority and the index of the cache expiry time. However, the index regarding a cache is not limited thereto. For example, when the case in which a cache is requested by sending a request to a cache server located in the vicinity of the cache is taken into account, the index of the range of the vicinity can be used.

In addition, in the example according to the above-described embodiment, the multi-view video data streams that constitute a three-dimensional image are MPEG-DASH based video data streams. However, the MPEG-DASH based video data streams may be replaced with another type of video data stream that can be grouped. Even in such a case, by setting, in the MPD file, the index regarding a cache in accordance with each of the groups, the CDN 14 can efficiently perform cache and delivery resource management of the DASH segments of the video data streams.

In addition, according to the above-described embodiment, the present technology is applied to a stream delivery system that delivers MPEG-DASH based video data streams. It is to be noted that the present technology can be applied to another similar type of delivery system of a video data stream in the same manner.

Furthermore, the present technology can have the following configurations.

(1) A transmission device includes a meta file generating unit configured to generate a meta file including information used by a client terminal to acquire a predetermined number of video data streams of given content deliverable by a delivery server via a network, and a meta file transmitting unit configured to upon receiving a transmission request from the client terminal, transmitting the meta file to the client terminal via the network. The meta file generating unit sets, in the meta file, an index regarding a cache of each of the video data streams in the network.

(2) In the transmission device described in (1), the index regarding a cache is the index of a cache priority of a corresponding video data stream in the network.

(3) In the transmission device described in (1), the index regarding a cache is the index of a cache expiry time of a corresponding video data stream in the network.

(4) In the transmission device described in any one of (1) to (3), the predetermined number of video data streams are multi-view video data streams that constitute a three-dimensional image.

(5) In the transmission device described in (4), the meta file generating unit determines the index regarding a cache of each of the multi-view video data streams on the basis of viewpoint groups classified using estimated frequency of a request for delivery of each of the multi-view video data streams.

(6) In the transmission device described in any one of (1) to (5), the predetermined number of video data streams are MPEG-DASH based video data streams, the meta file is an MPD file, and the network is a CDN.

(7) In the transmission device described in (6), the meta file generating unit sets, in the MPD file, the index regarding a cache of each of the video data streams in the network using a DescriptorType element.

(8) A transmission method includes a meta file generating step of generating a meta file including information used by a client terminal to acquire a predetermined number of video data streams of given content deliverable by a delivery server via a network, and a meta file transmitting step of upon receiving a transmission request from the client terminal, transmitting the meta file to the client terminal via the network. In the meta file generating step, an index regarding a cache of each of the video data streams in the network is set in the meta file.

(9) A network apparatus includes a plurality of cache servers and a predetermined number of cache management servers. Upon receives a meta file including information used by a client terminal to acquire a predetermined number of video data streams of given content deliverable by a delivery server via a network, the cache server transmits the meta file to the cache management server. The cache management server generates a cache control policy on the basis of an index regarding a cache of each of the video data streams in the network included in the meta file and distributes the cache control policy to each of the cache servers.

(10) In the network apparatus described in (9), the index regarding a cache is an index of a cache priority and/or an index of a cache expiry time.

(11) In the network apparatus described in (9) or (10), the predetermined number of video data streams are MPEG-DASH based video data streams, the meta file is an MPD file, and the cache server is a DASH cache server.

Figure 22:
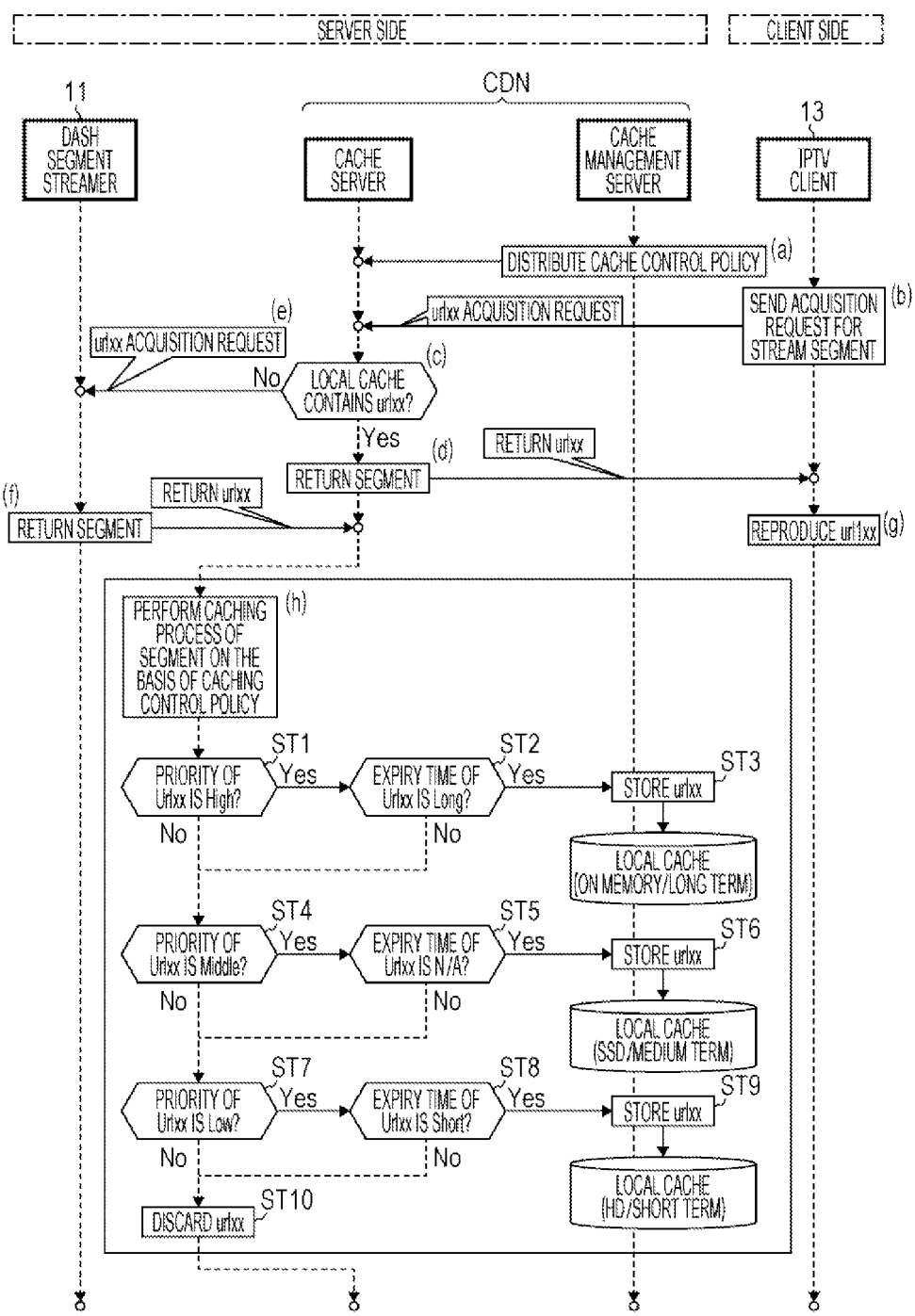
FIG. 22 illustrates an example of a cache control process performed by a cache server having a cache control policy distributed thereto.

The present technology is mainly characterized in that by setting, in the MPD file provided by the DASH MPD server 12, the indices regarding a cache, such as the index of the cache priority and the index of the cache expiry time of each of the DASH segments, cache and delivery resource management of the DASH segment of each of the video data streams in a CDN can be efficiently performed (refer to FIGS. 18 and 22).

REFERENCE SIGNS LIST 10 stream delivery system
11 DASH segment streamer
12 DASH MPD server
13, 13-1 to 13-3 IPTV client 14 CDN
15 content management server
16, 17 cache server
18 cache management server

The invention claimed is:

1. A transmission device comprising:
a meta file generating unit configured to generate a meta file including information used by a client terminal to acquire a predetermined number of video data streams of given content deliverable by a delivery server via a network; and
a meta file transmitting unit configured to upon receiving a transmission request from the client terminal, transmitting the meta file to the client terminal via the network,
wherein the meta file generating unit is configured to set, in the meta file, an index regarding a cache of each of the video data streams in the network,
wherein the predetermined number of video data streams are multi-view video data streams that constitute a three-dimensional image,
wherein the meta file generating unit is configured to determine the index regarding a cache of each of the multi-view video data streams based on viewpoint groups classified using estimated frequency of a request for delivery of each of the multi-view video data streams, each viewpoint group having a number of viewpoints in which each viewpoint represents a respective position from which a video data stream was captured, and
wherein the index regarding a cache indicates a cache priority or a cache expiry time is set so as to correspond to the number of viewpoints in the viewpoint groups as compared to each other such that the video data stream or streams of a first viewpoint group having a first number of viewpoints will have a higher priority or a longer expiry time as compared to the video data stream or streams of a second viewpoint group having a second number of viewpoints, in which the first number is less than the second number.

2. The transmission device according to claim 1, wherein the predetermined number of video data streams are MPEG-DASH based video data streams, the meta file is an MPD file, and the network is a CDN.

3. The transmission device according to claim 2, wherein the meta file generating unit sets, in the MPD file, the index regarding a cache of each of the video data streams in the network using a DescriptorType element.

4. The transmission device according to claim 1, in which the first viewpoint group has two viewpoints which are a leftmost viewpoint and a rightmost viewpoint.

5. The transmission device according to claim 4, in which the second viewpoint group has three viewpoints which are the leftmost viewpoint, the rightmost viewpoint, and a middle viewpoint.

6. The transmission device according to claim 5, in which the video data stream or streams of a third viewpoint group which has five viewpoints which include the leftmost viewpoint, the rightmost viewpoint, the middle viewpoint, a left middle viewpoint, and a right middle viewpoint has an index with a lowest priority or a shortest expiry time as compared to those of the video data stream or streams of the second viewpoint group and the first viewpoint group.

7. A transmission method comprising:
a meta file generating step of generating a meta file including information used by a client terminal to acquire a predetermined number of video data streams of given content deliverable by a delivery server via a network; and
a meta file transmitting step of upon receiving a transmission request from the client terminal, transmitting the meta file to the client terminal via the network,
wherein in the meta file generating step, an index regarding a cache of each of the video data streams in the network is set in the meta file,
wherein the predetermined number of video data streams are multi-view video data streams that constitute a three-dimensional image,
wherein the meta file generating step includes determining the index regarding a cache of each of the multi-view video data streams based on viewpoint groups classified using estimated frequency of a request for delivery of each of the multi-view video data streams, each viewpoint group having a number of viewpoints in which each viewpoint represents a respective position from which a video data stream was captured, and
wherein the index regarding a cache indicates a cache priority or a cache expiry time is set so as to correspond to the number of viewpoints in the viewpoint groups as compared to each other such that the video data stream or streams of a first viewpoint group having a first number of viewpoints will have a higher priority or a longer expiry time as compared to the video data stream or streams of a second viewpoint group having a second number of viewpoints, in which the first number is less than the second number.

8. A network apparatus comprising:
a plurality of cache servers; and
a predetermined number of cache management servers,
wherein upon receipt of a meta file including information used by a client terminal to acquire a predetermined number of video data streams of given content deliverable by a delivery server via a network, the cache server transmits the meta file to the cache management server,
wherein the cache management server generates a cache control policy on the basis of an index regarding a cache of each of the video data streams in the network included in the meta file and distributes the cache control policy to each of the cache servers,
wherein the predetermined number of video data streams are multi-view video data streams that constitute a three-dimensional image,
wherein the index regarding a cache of each of the multi-view video data streams is based on viewpoint groups classified using estimated frequency of a request for delivery of each of the multi-view video data streams, each viewpoint group having a number of viewpoints in which each viewpoint represents a respective position from which a video data stream was captured, and
wherein the index regarding a cache indicates a cache priority or a cache expiry time is set so as to correspond to the number of viewpoints in the viewpoint groups as compared to each other such that the video data stream or streams of a first viewpoint group having a first number of viewpoints will have a higher priority or a longer expiry time as compared to the video data stream or streams of a second viewpoint group having a second number of viewpoints, in which the first number is less than the second number.

9. The network apparatus according to claim 8, wherein the predetermined number of video data streams are MPEG-DASH based video data streams, the meta file is an MPD file, and the cache server is a DASH cache server.

* * * * *